United States Patent
Toyama et al.

[11] Patent Number: 6,061,487
[45] Date of Patent: May 9, 2000

[54] OPTICAL WAVEGUIDE CIRCUIT, OPTICAL BRANCHED WAVEGUIDE CIRCUIT, AND OPTICAL MODULATOR

[75] Inventors: Jiro Toyama; Ichiro Takatsu; Takeshi Yamada; Yasuhiro Kubota; Shinji Ushijima, all of Ibaraki, Japan

[73] Assignee: NOK Corporation, Tokyo, Japan

[21] Appl. No.: 09/069,970

[22] Filed: Apr. 30, 1998

[30] Foreign Application Priority Data

| Apr. 30, 1997 | [JP] | Japan | 9-112236 |
| May 23, 1997 | [JP] | Japan | 9-133464 |
| Jun. 23, 1997 | [JP] | Japan | 9-166189 |
| Jul. 16, 1997 | [JP] | Japan | 9-191620 |

[51] Int. Cl.[7] .................................. G02B 6/26
[52] U.S. Cl. ................................ 385/47; 359/618
[58] Field of Search ......................... 385/24, 31, 39, 385/35, 45, 48, 147; 359/118, 127, 618

[56] References Cited

U.S. PATENT DOCUMENTS

| 4,767,171 | 8/1988 | Rudolf et al. | 385/35 |
| 4,824,200 | 4/1989 | Hideki et al. | 385/45 |
| 5,214,725 | 5/1993 | Hisaharu et al. | 385/45 |
| 5,239,600 | 8/1993 | Yuichi et al. | 385/48 |
| 5,764,825 | 6/1998 | Akira et al. | 385/24 |
| 5,771,322 | 6/1998 | Kiyoto et al. | 385/31 |

FOREIGN PATENT DOCUMENTS

| 63-33708 | 2/1988 | Japan . |
| 63-106630 | 5/1988 | Japan . |
| 63-129325 | 6/1988 | Japan . |
| 4-293004 | 10/1992 | Japan . |
| 06085368 | 3/1994 | Japan . |
| 06273698 | 9/1994 | Japan . |
| 06331837 | 12/1994 | Japan . |
| 07128693 | 5/1995 | Japan . |
| 07152053 | 6/1995 | Japan . |
| 07138984 | 12/1995 | Japan . |

*Primary Examiner*—Akm E. Ullah
*Attorney, Agent, or Firm*—Jacobson, Price, Holman & Stern, PLLC

[57] ABSTRACT

An optical branched waveguide and an optical waveguide circuit which are easily fabricated, have a small size, and are low in cost. A linear first optical waveguide and second optical waveguide are crossed at a predetermined angle with respect to the substrate, a groove forming a predetermined angle relative to the optical waveguides and having a depth set to not less than the depth of the first and second optical waveguides is formed so as to include the intersecting region of the first optical waveguide and the second optical waveguide, and an optical element having a partial reflection and partial transmission function passing part of an incident light guided through the first optical waveguide therethrough and guiding this to the first optical waveguide and, at the same time, reflecting part of the incident light and guiding the same to the second optical waveguide is inserted into the groove so as to include the intersecting region of the first optical waveguide and the second optical waveguide.

39 Claims, 11 Drawing Sheets

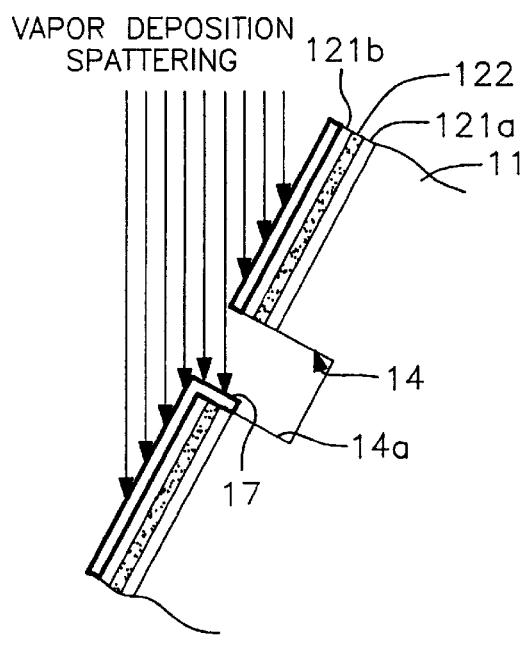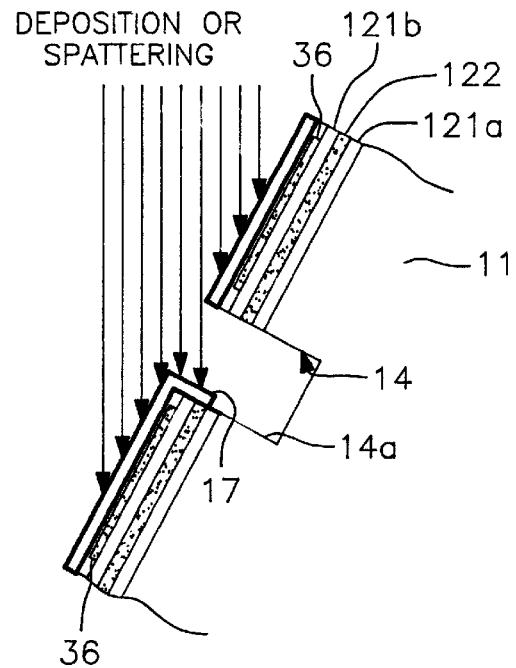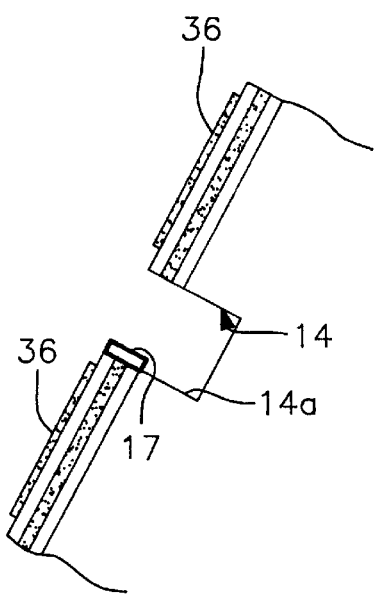

OPTICAL WAVEGUIDE CIRCUIT, OPTICAL BRANCHED WAVEGUIDE CIRCUIT, AND OPTICAL MODULATOR

BACKGROUND ART

1. Technical Field of the Invention

The present invention relates to an optical waveguide circuit, optical branched waveguide circuit, and optical modulator. More particularly, the invention relates to an optical waveguide circuit, optical branched waveguide circuit, and optical modulator which are used for optical wiring parts of optical communications, vehicles, etc. or optical signal processing, optical control, and optical measurement of industrial equipment, have a small size, and can be easily fabricated.

2. Description of the Related Art

Due to advances in optical communications technology and optical signal processing technology, increasing use is being made of optical wiring in vehicles via optical fibers, optical measurement for controlling various types of industrial equipment using optical signals, optical signal processing, etc. Optical waveguide circuits, optical branched circuits, optical branched waveguide circuits, and optical modulators are being used in these fields.

First, a description will be given of an optical branched waveguide used in a Mach-Zehnder type optical modulator.

FIG. 1 is a view of the configuration of a Mach-Zehnder type optical modulator of the related art. A Mach-Zehnder type optical modulator 90 illustrated in FIG. 1 is constituted by an input waveguide 92 formed in a substrate 91, Y-branch type waveguides $93_1$ and $93_2$, linear waveguides $94_1$ and $94_2$, Y-branch type waveguides $95_1$ and $95_2$, an output waveguide 96, and electrodes $97_1$ to $97_4$ provided on the two sides of the linear waveguides $94_1$ and $94_2$.

Light is emitted to the input waveguide 92 and is branched at the Y-branch type waveguides $93_1$ and $93_2$. The branched lights are propagated through the linear waveguides $94_1$ and $94_2$. In the process, the lights are modulated in response to the voltages applied to the Y-branch type waveguides $93_1$ and $93_2$. The modulated lights pass through the Y-branch type waveguides $95_1$ and $95_2$ and are combined at the output waveguide 96. The result is output from an end portion of the output waveguide 96. The lights propagated through the linear waveguides $94_1$ and $94_2$ are changed in phase by an electro-optic effect by applying an electric field based on the modulation signal to the linear waveguides $94_1$ and $94_2$ via the electrodes $97_1$ to $97_4$. The intensity of the output interference light changes in response to this change in phase for modulation of the light.

The input waveguide 92 and the Y-branch type waveguides $93_1$ and $93_2$ in the Mach-Zehnder type optical modulator 90 constitute the optical branched waveguide illustrated in FIGS. 2 and 3.

The Mach-Zehnder type optical modulator illustrated in FIG. 1 encounters the disadvantages due to the restrictions of the dimensions of the optical branched waveguide illustrated in FIGS. 2 and 3 etc.

The optical branched waveguide illustrated in FIGS. 2 and 3 suffers from the disadvantage of large dimensions and difficulty of reduction of size. As a result, the Mach-Zehnder type optical modulator illustrated in FIG. 1 also suffers from the disadvantage of enlargement of size.

The disadvantage of the inability of the optical branched waveguide to be reduced in size will be considered next.

In the optical modulator, the propagated light must be of a single mode, therefore the input waveguide 92 and the Y-branch type waveguides $93_1$ and $93_2$ constituting the modulator are restricted in design by the length of the branched light path. For example, in the case of an optical branched waveguide using lithium niobate, a branch angle θ of the Y-branch type waveguides $93_1$ and $93_2$ for branching while maintaining the single mode is very small, i.e., about 1°. As a result, the input waveguide 92 and the Y-branch type waveguides $93_1$ and $93_2$ must be almost linearly connected.

Further, the difference of the refractive indexes of a core and a cladding of the waveguide is made small to obtain a single mode waveguide, therefore, in order to draw waveguides having a slope with a branch angle θ of 1° parallel to the input waveguide 92 perpendicular to the end face of the rectangular substrate, to prevent the leakage of light to the outside of the waveguides, the radius of curvature R of the waveguides must be set to 50 mm or more and the curved portion a must be made 5 to 10 mm.

Further, at the connection portion of the Y-branch type waveguides $93_1$ and $93_2$, the waveguide width becomes double when viewed from the input waveguide 92 side. If the waveguides are simply connected, the transmission loss is increased due to the reflection of light or conversion of the transmission mode. For this reason, an excess length b of several millimeters becomes necessary for tapering the connection portion and smoothly converting the transmission mode.

Further, in order to send the optical signal to the input waveguide 92, a linear waveguide c of a predetermined length or more, for example, 3 mm or more, becomes necessary to reduce the disturbance in the transmission mode at the connection point.

When all these are added up, the entire length of the Y-branch portion becomes about 15 mm or more.

In the Mach-Zehnder type optical modulator 90, it is necessary to provide two sets of such Y-branch type waveguides facing to each other and further provide the linear waveguides $94_1$ and $94_1$ for application of the electric field between them. As a result, the entire modulator has a length of 40 to 50 mm or more. This dimension is very large considering the fact that most semiconductor devices undergoing the same type of process are less than 1 mm square in size.

With a modulator having such a length, when considering the machining after this and deformation of the parts, the width of the substrate must be made at least 6 mm—resulting in a part with a very large dimension.

In this way, in the Mach-Zehnder type optical modulator, the reduction of size is difficult. Since the size is large, the number of devices which can be obtained from one substrate is small compared with usual semiconductor devices. For example, 10 or less Mach-Zehnder type optical modulators 90 shown here can be obtained from a 3-inch square substrate generally used in the fabrication of optical parts. This is very small when compared with many semiconductor devices made using a similar process. As a result, the Mach-Zehnder type optical modulator of the related art suffers from the disadvantages that the productivity is low and the cost can not be reduced.

Further, the Mach-Zehnder type optical modulator also suffers from the disadvantages that its structure is complex and therefore production is difficult. The shape of the connection portion of the Y-branch portion of the Mach-Zehnder type optical modulator 90 has an influence upon the branch characteristics and loss, therefore the portion must be very precisely produced. Particularly, a machining precision of about 0.1 μm becomes necessary for the center conically shaped portion of the branch. As a result, very high precision machining becomes necessary, and there arises the disadvantage of a further increase of costs.

While the optical branched waveguide was explained above in relation to the Mach-Zehnder type optical modulator 90, the same disadvantages are encountered even when viewing an optical branched waveguide alone.

SUMMARY OF THE INVENTION

An object of the present invention is to provide an optical branched waveguide which is small size, can be easily fabricated, and is low in price.

Another object of the present invention is to provide an optical modulator having an optical branched waveguide which is small size, can be easily fabricated, and is low in price.

Still another object of the present invention is to provide an optical branched waveguide with a small optical loss.

According to the present invention, there is provided an optical branched waveguide having a substrate; a first optical waveguide formed on the substrate; a second optical waveguide formed on the substrate so as to intersect with the first optical waveguide at a predetermined angle; and an optical element which is provided at an intersecting region of the first optical waveguide and the second optical waveguide, allows part of an incident light guided through the first optical waveguide to pass therethrough and guides it to the first optical waveguide, and reflects part of the incident light and guides it to the second optical waveguide.

Also, according to the present invention, there is provided an optical branched waveguide having a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is inserted into at least the intersecting region of the first optical waveguide and the second optical waveguide in the groove, allows part of the incident light guided through the first optical waveguide to pass therethrough and guides it to the first optical waveguide, and reflects part of the incident light and guides it to the second optical waveguide.

Preferably, the groove and optical waveguides are formed so that an optical reflection angle of the light incident from the first optical waveguide caused by the optical element and an angle formed by the second optical waveguide with the first optical waveguide coincide.

Also, preferably, the optical element is obtained by forming a thin optical film on an organic film transparent with respect to the guided light. Alternatively, the optical element is constituted by forming a thin optical film on a thin sheet made of an inorganic material transparent with respect to the guided light. The thin optical film is constituted by a multiple layer interference film or metal film.

Further, preferably, a light branching ratio for transmitting and reflecting the light of the optical element is 1:1.

Further, preferably, the substrate is constituted by a member having an electro-optic effect or a member having a piezoelectric effect.

Further, preferably, the optical waveguide circuit of the present invention has at least one set of the above branched waveguides and has connected to at least one optical waveguide of an input portion or an output portion thereof the optical waveguide of another optical branched waveguide.

Further, the optical waveguide circuit of the present invention has at least one set of optical branched waveguides having an electro-optic effect as a substrate and has electrodes for applying an electric field for creating the electro-optic effect in parts of the optical waveguides.

Further, the optical waveguide circuit of the present invention has at least one set of optical branched waveguides having a piezoelectric effect as a substrate and has electrodes for applying an electric field for creating the piezoelectric effect in parts of the optical waveguide.

According to the optical branched waveguide of the present invention, a complex tapered optical waveguide part and a large radius curved waveguide part as in a Y-branched waveguide are not required, an optical output end portion is separated so that an optical fiber can be connected, and the shape becomes small compared with conventional parts. Further, the waveguide is fabricated with a relatively large intersecting angle, therefore the shape of the branch portion is relatively easily obtained. Further, since the characteristics of the part such as the loss and branching ratio depend upon the optical element having a partial transmission and partial reflection function, management of characteristics becomes easy.

Further, the present optical branched waveguide is naturally used in a 1×2 optical branched waveguide circuit providing the basic function, but can also be utilized in a 1×N optical branched waveguide circuit providing a plurality of this type of function on a substrate, an optical waveguide circuit combined with another optical waveguide circuit, and an optical functional device utilizing an electro-optic effect, piezoelectric effect, and surface elastic wave effect together with this.

According to the present invention, there is further provided an optical branched waveguide having a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide, and reflects part of the incident light and guides this to the second optical waveguide.

Preferably, the groove and optical waveguides are formed so that an optical reflection angle of the light incident from the first optical waveguide caused by the optical element and an angle formed by the second optical waveguide with the first optical waveguide coincide.

Also, preferably, the light branching ratio for transmitting and reflecting the light of the optical element is 1:1.

Further, preferably, the optical waveguide circuit of the present invention has at least one set of the above branched waveguides and has connected to at least one optical waveguide of an input portion or an output portion thereof the optical waveguide of another optical branched waveguide.

According to the optical branched waveguide of the present invention, the complex tapered optical waveguide part and the large radius curved waveguide part as in a Y-branch waveguide are not required, the optical output end portion is separated so that an optical fiber can be connected, and the shape becomes small compared with conventional parts. Further, since the waveguide is fabricated with a relatively large intersecting angle, the shape of the branch portion is relatively easily obtained.

Further, since the characteristics of the part such as the loss and branching ratio depend upon the optical element having a partial transmission and partial reflection function, management of characteristics becomes easy.

Further, the present optical branched waveguide is naturally used in a 1×2 optical branched waveguide circuit providing the basic function, but can also be utilized in a 1×N optical branched waveguide circuit providing a plurality of this type of function on a substrate, an optical waveguide circuit combined with another optical waveguide circuit, and an optical functional device utilizing an electro-optic effect, piezoelectric effect, and surface elastic wave effect together with this.

According to the present invention, there is further provided an optical branched waveguide having a substrate; a first optical waveguide formed on the substrate; a second optical waveguide formed on the substrate so as to intersect with the first optical waveguide at a predetermined angle; and an optical element which is provided in an intersecting region of the first optical waveguide and the second optical waveguide, allows part of an incident light guided through the first optical waveguide to pass therethrough and guides it to the first optical waveguide, and reflects part of the incident light and guides it to the second optical waveguide, the width of the waveguide facing the optical element of at least one optical waveguide being set larger than the width of the waveguide of the other parts.

Also, according to the present invention, there is provided an optical branched waveguide having a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is inserted into at least at the intersecting region of the first optical waveguide and the second optical waveguide in the groove, allows part of the incident light guided through the first optical waveguide to pass therethrough and guides it to the first optical waveguide, and reflects part of the incident light and guides it to the second optical waveguide, the width of the waveguide facing the groove being set larger than the width of the waveguide of the other parts.

Also, according to the present invention, there is provided an optical branched waveguide having a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is inserted into at least at the intersecting region of the first optical waveguide and the second optical waveguide in the groove, allows part of the incident light guided through the first optical waveguide to pass therethrough and guides it to the first optical waveguide, and reflects part of the incident light and guides it to the second optical waveguide, the center axes of the optical waveguides sandwiching the groove being deviated by exactly a dimension corresponding to the deviation of the optical axes due to an average refractive index of the groove portion.

Preferably, the groove and optical waveguides are formed so that an optical reflection angle of the light incident from the first optical waveguide caused by the optical element and an angle formed by the second optical waveguide with the first optical waveguide coincide.

According to the optical branched waveguide of the present invention, since a complex tapered optical waveguide part and a large radius curved waveguide part as in a Y-branched waveguide are not required, an optical output end portion is separated so that an optical fiber can be connected, and the shape becomes small compared with conventional parts. Further, the waveguide is fabricated with a relatively large intersecting angle, therefore the shape of the branch portion is relatively easily obtained. Further, since the characteristics of the part such as the loss and branching ratio depend upon the optical element having a partial transmission and partial reflection function, management of characteristics becomes easy.

In this way, the invention is very effective as a means for realizing a small size and simply shaped optical waveguide, but refraction of the optical path, known by the law of optical waveguides and Snell's law, occurs and the connection loss due to a deviation of the optical path is increased when the light strikes the connected linear waveguide after intersecting the groove, so the insertion loss characteristic required for the optical branched waveguide is sometimes deteriorated. However, in the present optical branched waveguide, since the width of the waveguide at the parts of the optical waveguides at the parts of the intersecting linear waveguides for forming the groove into which the thin optical film is inserted is set larger than that of the other parts, the deviation of the optical path due to the refraction of the optical path is reduced. Even after the light passes through the thin optical film support and the space in the groove, it is efficiently introduced into the subsequent optical waveguide or the optical waveguide for guiding the light after reflection by the thin optical film. Namely, according to the present optical branched waveguide, the optical loss is reduced.

In the modulator of the present invention, use was made of a branched waveguide comprised of two optical waveguides made to intersect on the same plane and a partially transmission and partial reflection thin optical film provided at the intersecting portion for dividing the input light into reflection light and transmission light. No use is made of a Y-branch waveguide which is a cause preventing the reduction of size and requires high precision machining.

Therefore, according to the present invention, there is further provided a modulator having a substrate; a first optical waveguide which is formed on the substrate, comprises an electro-optic material, has one end portion serving as a light incident portion; a second optical waveguide which is formed on the substrate so as to intersect with the first optical waveguide at a predetermined angle, comprises an electro-optic material, and has one end portion serving as a light emitting portion; a first full reflection optical member provided at the other end portion of the first optical waveguide; a second full reflection optical member provided at the other end portion of the second optical waveguide; a partial reflection optical member which is provided at the intersecting portion of the first optical waveguide and the second optical waveguide, reflects part of the light striking the first optical waveguide and makes it incident in the direction of the end portion of the side where the second full reflection optical member of the second optical waveguide is provided, allows part to pass therethrough and makes it incident in the direction of the first full reflection optical member of the first waveguide, reflects parts of the lights reflected at the first and second full reflection optical members and made incident upon it and guides the same to the other waveguide different from the optical waveguide to which the light was guided, and allows parts to pass therethrough and subsequently guides the same through the optical waveguide through which the light was guided; and an electrode provided at least at one of a space between the partial reflection optical member and the first full reflection optical member of the first optical waveguide and a space between the partial reflection optical member and the second full reflection optical member of the second optical waveguide and applying an electric field based on a desired modulation signal to the optical waveguide.

In the optical modulator having the configuration of the present invention, part of the light striking one end portion of the first optical waveguide is reflected by the partial reflection optical member and made incident upon the second optical waveguide, and part is allowed to pass as it is and thereby to be branched. Each branched portion of light is fully reflected by the second and first full reflection optical members and made incident again upon the partial reflection optical member. The light which is fully reflected by the second full reflection optical member and passes through the partial reflection optical member and the light fully reflected by the first full reflection optical member and reflected at the partial reflection optical member interfere with each other to become the output light signal which is output from one end portion of the second optical waveguide. Accordingly, if changing the phase of the propagated light passing back and forth in the waveguide by the electro-optic effect via the electrode, this means electric control of the intensity of the interference light due to the reflected light between the two optical paths and thus enables operation as an optical modulator.

Preferably, the substrate is formed with a groove having side walls covering the cross-section of the optical waveguides at the intersecting portion of the first optical waveguide and the second optical waveguide, and the partial reflection optical member is formed by inserting a film member forming the partial transmission and partial reflection film for obtaining a desired light branching ratio into the groove.

Further, preferably, the substrate is formed with a groove having side walls covering the cross-section of the optical waveguides at the intersecting portion of the first optical waveguide and the second optical waveguide, and the partial reflection optical member is configured by directly forming the partial transmission and partial reflection film for obtaining a desired light branching ratio on a side wall of the groove.

When constructing a Michelson type interferometer, preferably the first optical waveguide and the second optical waveguide intersect at right angles relative to each other, and the partial reflection optical member intersects with the first and second optical waveguides at 45° and is constituted by the first and second optical waveguides and the full reflection member.

BRIEF DESCRIPTION OF THE DRAWINGS

The above objects and features and other objects and features will be more apparent from the following description given with reference to the accompanying drawings, wherein:

FIG. 10 is a partial sectional view of the optical branched waveguide illustrating a method of forming a partial reflection and partial transmission film in a groove formed in the optical branched waveguide illustrated in FIG. 8;

FIGS. 13A and 13B are partial sectional views of the optical branched waveguide illustrating another method of forming the partial reflection and partial transmission film in a groove formed in the optical branched waveguide illustrated in FIG. 8;

DETAILED DESCRIPTION OF THE PREFERRED EMBODIMENTS

Preferred embodiments of the optical branched circuit, optical waveguide circuit, and optical modulator of the present invention will be explained below with reference to the attached drawings.

First Embodiment

Figure 1:
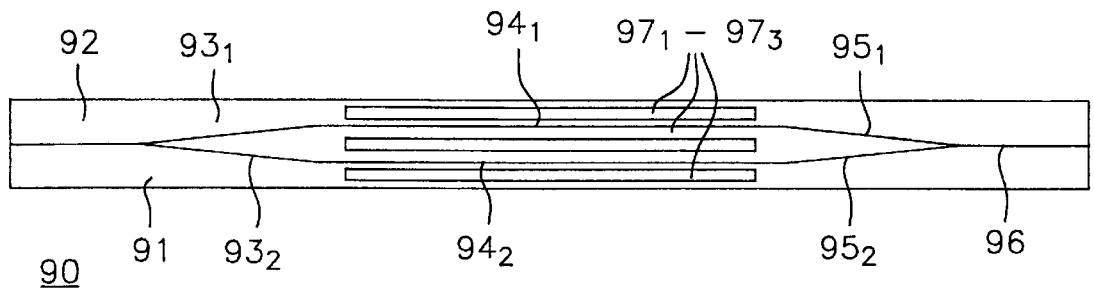
FIG. 1 is a view of the configuration of a Mach-Zehnder type optical modulator of the related art.
Figure 2:
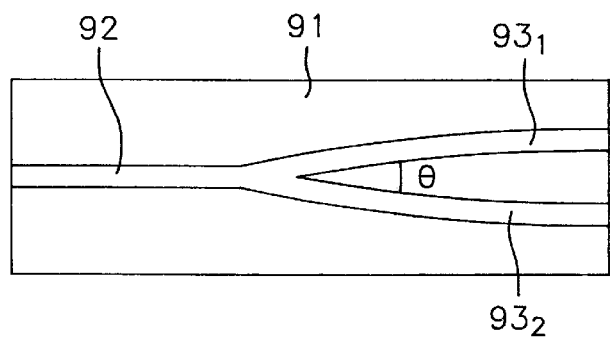
FIG. 2 is a plan view of an optical branched waveguide constituting part of the Mach-Zehnder type optical modulator of FIG. 1.
Figure 3:
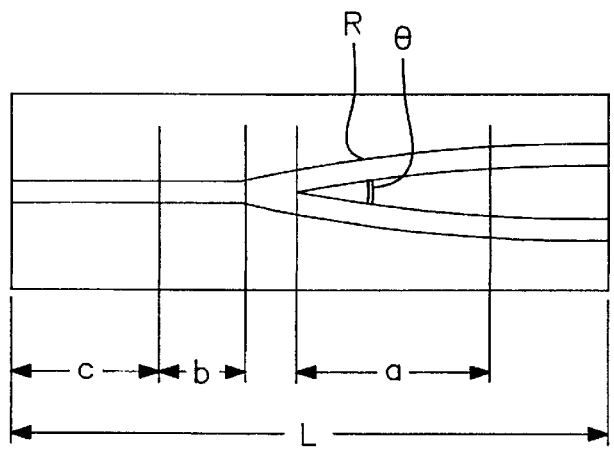
FIG. 3 is a view illustrating a dimension of the optical branched waveguide illustrated in FIG. 2.
Figure 4:
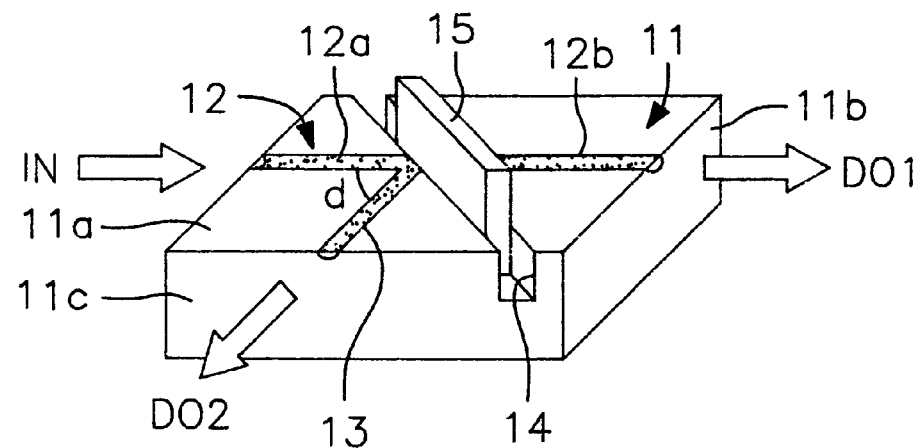
FIG. 4 is a perspective view of the optical branched waveguide according to a first embodiment of the present invention.
Figure 5:
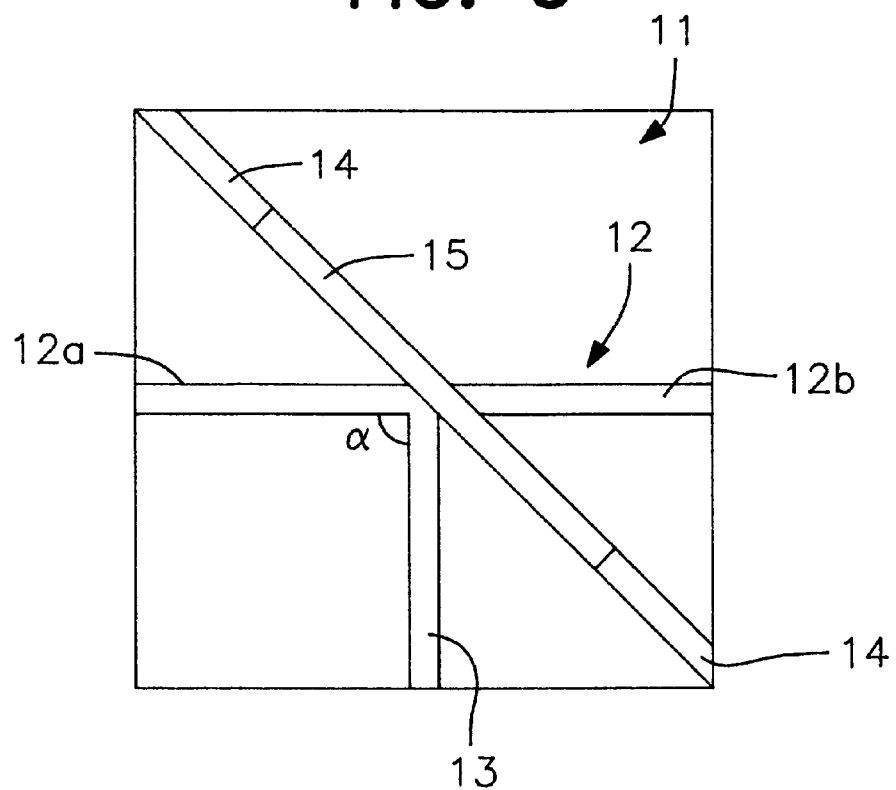
FIG. 5 is a plan view of the optical branched waveguide illustrated in FIG. 4.

FIGS. 4 and 5 are views of an optical branched waveguide according to a first embodiment of the present invention, in which FIG. 4 is a perspective view of the optical branched waveguide unit; and FIG. 5 is a plan view of the optical branched waveguide unit.

An optical branched waveguide 10 according to the first embodiment of the present invention illustrated in FIG. 4 and FIG. 5 has a substrate 11 transparent with respect to the wavelength of the light to be used, a first optical waveguide 12 comprising two linear optical waveguides 12a and 12b formed in this substrate 11, and a second optical waveguide 13. The first optical waveguide 12 and the second optical waveguide 13 intersect with each other at a predetermined angle α, for example, a relatively large angle of from tens of degrees to 90 degrees. In this embodiment, the intersecting angle α is about 90°.

The optical branched waveguide 10 has a groove 14 which is formed to contain the intersecting region of the first optical waveguide 12 and the second optical waveguide 13 by forming an angle of 45 degrees together with the optical waveguides, has a width of about 30 μm, and has a depth of not less than the depth of the first and second optical waveguides 12 and 13, e.g., 10 μm or more.

The optical branched waveguide 10 has an optical element 15 inserted in the groove 14. The groove 14 has inserted into it the optical element 15 inserted so as to include at least the intersecting region of the first optical waveguide 12 and the second optical waveguide 13 of the groove 14. The optical element 15 has a partial reflection and partial transmission function. The optical element 15 allows part of the incident light which strikes the first optical waveguide 12a and is guided through the internal portion thereof to pass therethrough and guides it to the first optical waveguide 12b and, at the same time, reflects part of the incident light and guides it to the second optical waveguide 13.

One end surface of the first optical waveguide 12 faces a first side surface 11a of the substrate 11. The light incident portion is constituted by one end surface of this first optical waveguide 12. The optical branched waveguide 10 is constituted so that the other end surface of the first optical waveguide 12 faces a second side surface 11b of the substrate 11, one end surface of the second optical waveguide 13 intersects with part of the first optical waveguide 12a, and the other end surface of the second optical waveguide 13 faces a third side surface 11c of the substrate 11. A light emitting portion of branched lights DO1 and DO2 is constituted by the other end surface of the first optical waveguide 12 and the other end surface of the second optical waveguide 13.

In this way, in the optical branched waveguide 10, the optical waveguide 12a on the left side of the groove 14 acts as the input light waveguide for receiving and guiding the incident light, the optical waveguide 13 acts as the first branched light waveguide for receiving and guiding the light reflected at the optical element 15, and the optical waveguide 12b on the right side of the groove 14 acts as the second branched light waveguide for receiving and guiding the light transmitted through the optical element 15.

Note that the groove 14 and the optical waveguides 12a, 12b, and 13 are constituted so that the light reflection angle of the light incident from the first optical waveguide 12 due to the optical element 15 and the angle formed by the second optical waveguide 13 with the first optical waveguide 12 coincide.

The optical element 15 having the partial reflection and partial transmission function is constituted by the formation of a thin optical film on an organic film transparent to for example the guided light. Alternatively, the optical element 15 is obtained by the formation of a thin optical film (semi-transmission reflection film) on a thin sheet made of an inorganic material transparent with respect to the guided light. This thin optical film is formed by for example a multiple layer interference film or a metal film.

Next, a process of production of the optical branched waveguide 10 will be briefly explained.

In the present embodiment, a description will be given of a case where a polymer waveguide formed on a silicon substrate is used as the optical waveguide.

1. Formation of Optical Waveguide Part

First, a cladding layer is formed on a silicon wafer. A core layer is formed on this cladding layer. For the cladding layer, use is made of a polymer having a refractive index lower than the refractive index of the core layer. The core layer is formed by coating a polymer by spin coating or the like.

The thicknesses of the cladding layer and core layer are designed from the relationship of the final waveguide width and film thickness so as to obtain a single mode waveguide. In the present embodiment, the thickness of the core layer is 2 μm, and the thickness of the cladding layer is 3 μm.

In order to form the optical waveguide on the core layer, resist patterns having a width of 3 to 6 μm, preferably a width of 4 to 5 μm, intersecting in the form of a cross are formed by a photolithographic manufacturing method. Processing is performed by reactive ion etching (RIE) in oxygen gas so as to etch only the core layer and thereby form a rectangular optical waveguide having a shape and width of the resist and a thickness of the core layer.

Thereafter, the cladding layer is formed again on the surface by spin coating or the like.

As apparent from above description, the result is a structure in which the optical waveguide part is formed on the core layer and in which the core layer and the optical waveguide part are surrounded by cladding layers on the two sides.

2. Formation of Groove

Next, a dicing saw with a metal blade of about 30 μm are used to form a groove at an angle of 45 degrees to the intersecting optical waveguides perpendicular to the substrate to a depth of 10 μm or more.

3. Insertion of Optical Element 15

A ribbon-shaped partial reflection and partial transmission film 15 is inserted into the groove 14 and affixed to the cut surface of the groove 14 by using a transparent binder so that the partial reflection and partial transmission film 15 is tightly affixed to it.

4. Cutting of Single Optical Branched Waveguide

The optical waveguide circuit is cut to a rectangular shape at a right angle to the waveguides and including the intersecting point by using a dicing saw.

One optical branched waveguide 10 illustrated in FIG. 4 is produced by the above.

Note that by etching the silicon substrate in advance to form a V-groove to be used for the connection of the optical fiber, it is possible to facilitate the positioning of the fiber and the shortening of the process for fabrication of the parts and to simplify the connection process.

When producing the optical branched waveguides industrially, a net of optical waveguides intersecting at for example 1 mm is formed on the entire surface of a substrate of for example 3 inches square, then grooves 14 passing through the intersecting points of the optical waveguides and forming an angle of 45 degrees relative to the waveguides are formed over the entire surface. Then, partial reflection and partial transmission films 15 shaped as thin and long semi-transmission reflection film ribbons are inserted into the grooves 14 and affixed there by bonding. The result is adhered to the dicing use support film and cut by a dicing saw in straight lines passing through the intermediate points of the lattice at right angles (in parallel) to the waveguides to obtain a large number of optical branched waveguides.

Further, the partial reflection and partial transmission film 15 can be formed by vapor depositing a thin optical film such as a multiple-layer interference reflection film on for example a polyimide film or glass film by sputtering or other film formation techniques.

For forming the partial reflection and partial transmission film 15, use is made of the technology for preparing a half mirror in a spatial optical system.

Note that the above process is one example of the preparation of the present device. Even if the order of the affixment is changed or the method of coating the binder, the material of the waveguides, and the method of forming the waveguides are changed according to the respective materials and desired specifications, this does not detract from the gist of the present invention.

Next, the path of the light beam of the optical branched waveguide 10 will be explained.

The incident light IN is guided to the first optical waveguide 12a. This incident light is propagated through the first optical waveguide 12a and reaches the optical element 15 inserted in the groove 14. In the optical element 15, part of the guided light passes through, is guided to the first optical waveguide 12b again, and is emitted from the end surface of the optical waveguide 12b as the first branched light DO1.

Part or all of the remaining guided light not passing through the partial reflection and partial transmission film 15 is reflected at the partial reflection and partial transmission film 15, guided to the second optical waveguide 13, and emitted from the end surface thereof as the second branched light DO2.

As explained above, since, according to the present embodiment, two linear first and second optical waveguides 12 and 13 are formed so as to intersect with each other at a predetermined angle α with respect to the substrate 11 transparent to the used wavelength, a groove 14 which forms a predetermined angle α relative to the optical waveguides and has a depth set to not less than the depth of the first and second optical waveguides 12 and 13 is formed so as to contain the intersecting region of the first optical waveguide 12 and the second optical waveguide 13, and an optical element (partial reflection and partial transmission film) 15 which allows part of the incident light guided through the first optical waveguide 12a to pass therethrough and guides the same to the first optical waveguide 12b and, at the same time, reflects part of the incident light and guides the same to the second optical waveguide 13 is inserted into the groove 14 so as to include at least the intersecting region of the first optical waveguide 12 and the second optical waveguide 13 of the groove 14, a complex, tapered optical waveguide part and large radius curved waveguide part as in a Y-branch waveguide are not required, the optical output end portion is separated so that an optical fiber can be connected, and the shape becomes small compared with the parts of the related art.

If the groove for inserting the reflection film has a width of about 30 μm, the width of the waveguide is 5 to 10 μm, and the diameter of the optical fiber is 125 μm, even when considering the workability, a rectangular part with a side of 1 mm or less can be obtained. As the limit of the dimensions, a small size part of 125 μm square corresponding to the diameter of the optical fiber to be connected can be obtained. This dimension becomes a size of 1/100 or less of the branch substrate of the related art and the number of parts fabricated from one stock substrate becomes an inverse multiple thereof, therefore the cost per unit is greatly reduced.

The optical branched waveguide 10 is fabricated with a relatively large intersecting angle, therefore the shape of the branch portion is relatively easily obtained.

The characteristics of the optical branched waveguide 10 such as the loss and branching ratio depend upon the partial reflection and partial transmission film 15, therefore the management of the characteristics becomes easy.

The connection of the optical branched waveguide path 10 with the external circuits may be achieved by directly connecting an optical fiber or other waveguide at the side surface of the optical waveguide. Further, it is also possible to directly bond the light receiving element and light emitting element to an opening of the waveguide at the end surface of the substrate.

The substrate of the present embodiment is relatively small, therefore in order to facilitate handling, it is also possible to affix this substrate to a support substrate larger and cheaper than this substrate for supporting this substrate, make a V-groove in the support substrate, and connect the optical fiber or affix the light receiving element and light emitting element to the support substrate and affix the same to the waveguide. Of course, it is also possible to provide electrical wiring on the support substrate and use this as the light receiving and emitting unit.

Further, the present optical branched waveguide is naturally used in a 1×2 optical branched waveguide circuit providing the basic function, but can also be utilized in a 1×N optical branched waveguide circuit providing a plurality of this type of function on a substrate, an optical waveguide circuit combined with another optical waveguide circuit, and an optical functional device utilizing an electro-optic effect, piezoelectric effect, and surface elastic wave effect together with this.

Further, the most effective embodiment of this technology is the use as an optical 3 dB branch substrate comprising intersecting waveguides and a semi-transmission and semi-reflection film intersecting with them at 45 degrees. In this case, the side to which the input and output optical fiber is connected forms an orthogonal or parallel rhomboid (rectangle) so connection of the optical fiber is easy.

Note that, in the above embodiment, the description was made of a 1×2 optical branched waveguide, but the optical branched waveguide 10 can be modified in various ways. The optical branched waveguide 10 can be applied to not only optical branch circuits, but also various optical apparatuses.

Figure 6:
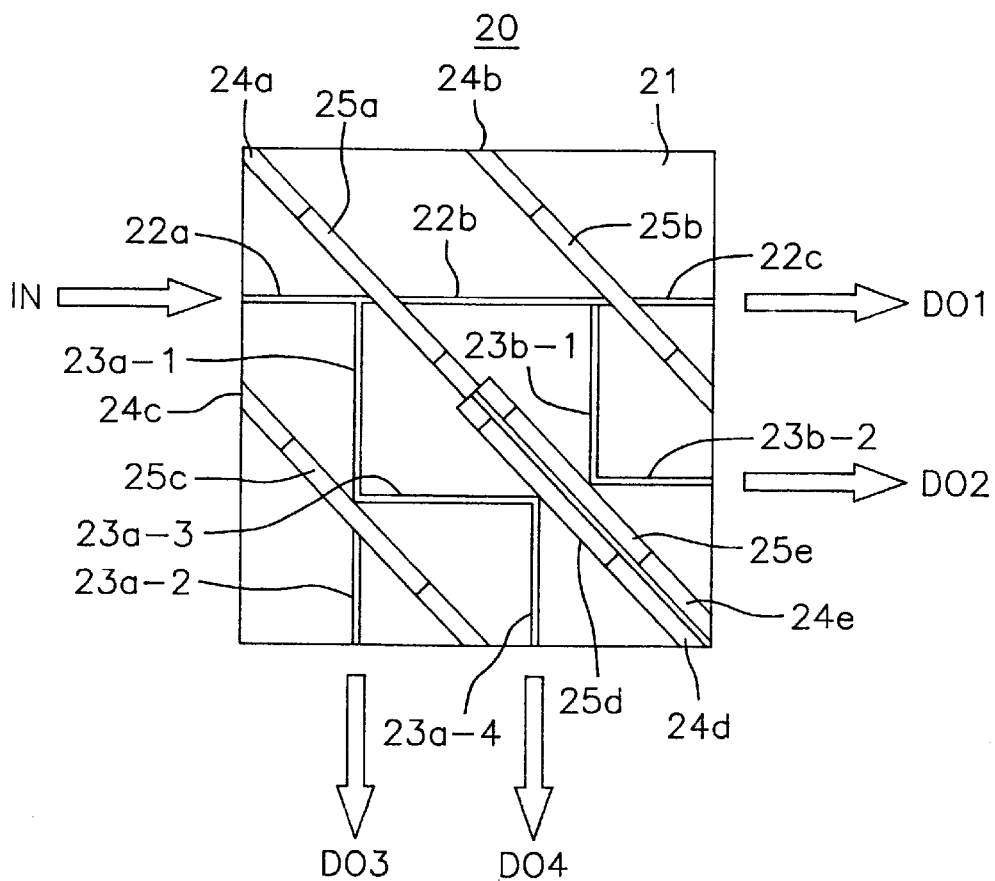
FIG. 6 is a plan view of the optical branched waveguide according to a first modification of the first embodiment of the present invention.

For example, a 1×4 optical branched waveguide 20 can be configured which branches and outputs the light reflected at and passed through the partial reflection and partial transmission film as shown in FIG. 6 twice and having an intensity of ¼ of the incident light.

Figure 7:
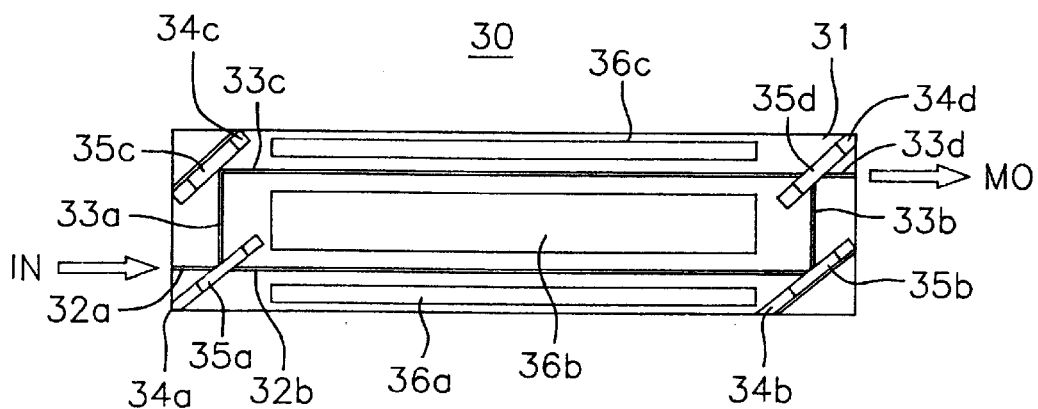
FIG. 7 is a plan view of an example in which the optical branched waveguide according to a second modification of the first embodiment of the present invention is applied to a Mach-Zehnder type optical modulator.

Further, the optical branched waveguide of the present embodiment can constitute an optical waveguide circuit combined with a Mach-Zehnder type optical modulator 30 illustrated in FIG. 7 or other optical waveguide circuit of the related art in one substrate.

Example of Application of Optical Branched Waveguide

In the ¼ optical branched waveguide 20 shown in FIG. 6, 21 denotes a substrate, 22a, 22b, 22c, 23a-1, 23a-2, 23a-3, 23a-4, 23b-1, and 23b-2 denote optical waveguides, 24a to 24e denote grooves, 25a to 25c denote semi-transmission reflection films serving as optical elements, and 25d and 25e denote reflection films serving as optical elements.

In the ¼ optical branched waveguide 20, the intersecting angle of the optical waveguides is 90 degrees. The grooves 24a to 24e are formed at angles of 45 degrees relative to the intersecting waveguides.

Next, the path of the light beam in the ¼ optical branched waveguide 20 will be explained.

The incident light IN is guided to the optical waveguide 22a. This incident light is propagated through the optical waveguide 22a and reaches the semi-transmission reflection film 25a serving as the optical element inserted in the groove 24a. In the semi-transmission reflection film 25a, part of the guided light passes through (goes straight ahead) and is guided to the optical waveguide 22b, while part or all of the remaining guided light is reflected and guided to the optical waveguide 23a-1. The guided light passed through the semi-transmission reflection film 25a is propagated through the optical waveguide 22b and reaches the semi-transmission reflection film 25b inserted in the groove 24b. In the semi-transmission reflection film 25b, part of the guided light passes through (goes straight ahead), is guided to the optical waveguide 22c, and is emitted from the other end surface thereof as the first branched light DO1. Further, part or all of the remaining guided light of the optical waveguide 22b is reflected at the semi-transmission reflection film 25b and guided to the optical waveguide 23b-1, reaches the reflection film 25e inserted in the groove 24e, is reflected there, guided to the optical waveguide 23b-2, and emitted from the other end surface thereof as the second branched light DO2.

The light reflected at the semi-transmission reflection film 25a and guided to the optical waveguide 23a-1 reaches the semi-transmission reflection film 25c inserted in the groove 24c. At the semi-transmission reflection film 25c, part of the guided light passes through (goes straight ahead), is guided to the optical waveguide 23a-2, and is emitted from the other end surface thereof as a third branched light DO3.

Part or all of the remaining guided light of the optical waveguide 23a-1 is reflected at the semi-transmission reflection film 25c, guided to the optical waveguide 23a-3, reaches the reflection film 25d inserted in the groove 24d, is reflected there, guided to the optical waveguide 23a-4, and emitted from the other end surface thereof as a fourth branched light DO4.

As described above, by using the optical branched waveguide according to the present invention, a ¼ optical branched waveguide 20 having the advantages that a reduction of size can be realized, a high yield can be obtained by substantially the same process as that of the related art, the operating efficiency per one device of the equipment can be improved, and further the yield can be improved, and a reduction of cost can be realized can be constituted.

Example of Application to Mach-Zehnder Type Optical Modulator

In the Mach-Zehnder type optical modulator 30 shown in FIG. 7, 31 denotes a substrate having for example an electro-optic effect, 32a, 32b, and 33a to 33d denote optical waveguides, 34a to 34d denote grooves, 35a and 35d denote semi-transmission reflection films serving as optical elements, 35b and 35c denote reflection films serving as optical elements, and 36a to 36c denote electrodes. In this Mach-Zehnder type optical modulator 30 as well, the intersecting angle of the optical waveguide is 90 degrees and the grooves 34a to 34d are formed at angles of 45 degrees relative to the intersecting waveguides.

In the Mach-Zehnder type optical modulator 30, the incident light IN is guided to the optical waveguide 32a. This incident light is propagated through the optical waveguide 32a and reaches the semi-transmission reflection film 35a serving as the optical element inserted in the groove 34a.

In the semi-transmission reflection film 35a, part of the guided light passes through (goes straight ahead) and is guided to the optical waveguide 32b, while part or all of the remaining guided light is reflected and guided to the optical waveguide 33a. The guided light passing through the semi-transmission reflection film 35a is propagated through the optical waveguide 32b and reaches the reflection film 35b inserted in the groove 34b, is reflected there, guided to the optical waveguide 33b, propagated through the optical waveguide 33b, and reaches the semi-transmission reflection film 35d.

Further, the light reflected at the semi-transmission reflection film 35a and guided to the optical waveguide 33a is propagated through the optical waveguide 33a and reaches the reflection film 35c inserted in the groove 34c, is reflected there, guided to the optical waveguide 33c, propagated through the optical waveguide 33c, and reaches the semi-transmission reflection film 35d.

Then, at the semi-transmission reflection film 35d, part of the propagated light of the optical waveguide 33b is reflected and guided to the optical waveguide 33d, while part of the propagated light of the optical waveguide 33c passes through (goes straight ahead) and is guided to the optical waveguide 32d.

Namely, the propagated light of the optical waveguide 33b and the propagated light of the optical waveguide 33c are combined.

In the Mach-Zehnder type optical modulator 30, a predetermined voltage is applied to for example a space between the electrode 36a and the electrode 36b or a space between the electrode 36c and the electrode 36b. By this, the electro-optic effect is manifested on the substrate 31, the refractive index of the optical waveguide 32b or the optical waveguide 33c changes, and a phase difference is given to the light branched into two at the semi-transmission reflection film 35a.

The two lights given this phase difference are combined at the semi-transmission reflection film 35d and emitted as the modulated light MO.

As described above, the Mach-Zehnder type optical modulator 30 can be constituted by using the optical branched waveguide according to the present invention.

As explained above, according to the present invention, the size can be reduced compared with the optical branched waveguide of the related art and consequently a reduction of size of the optical waveguide part can be realized. As a result, a high yield is obtained by substantially the same process as that of the related art, the operating efficiency per device of the equipment is improved, and a reduction of costs can be realized.

Also, in the optical branched waveguide of the present invention, the degree of demand for uniformity of the process is lower compared with the branching of the related art due to the reduction of size, consequently the yield is improved and a reduction of cost can be realized also in this point.

Further, the optical branched waveguide of the present invention does not have any sharp bent portions or curved portions, therefore the required precision of the photolithographic process is reduced and the costs can be reduced due to the reduction of the price of the equipment and the improvement of the yield.

Further, in the optical branched waveguide of the present invention, the branch characteristic does not depend upon the complex shape of the waveguides, but depends upon the thin optical film fabricated in a separate process, therefore there are the advantages that the management of the characteristics is easy and uniformity of characteristics and improvement of performance can be achieved.

Second Embodiment

Figure 8:
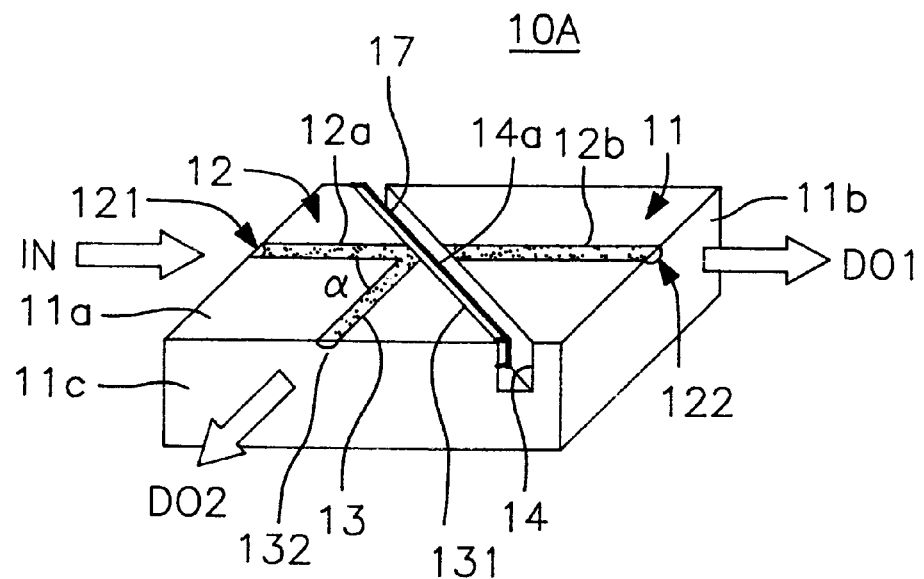
FIG. 8 is a perspective view of the optical branched waveguide according to a second embodiment of the present invention.
Figure 9:
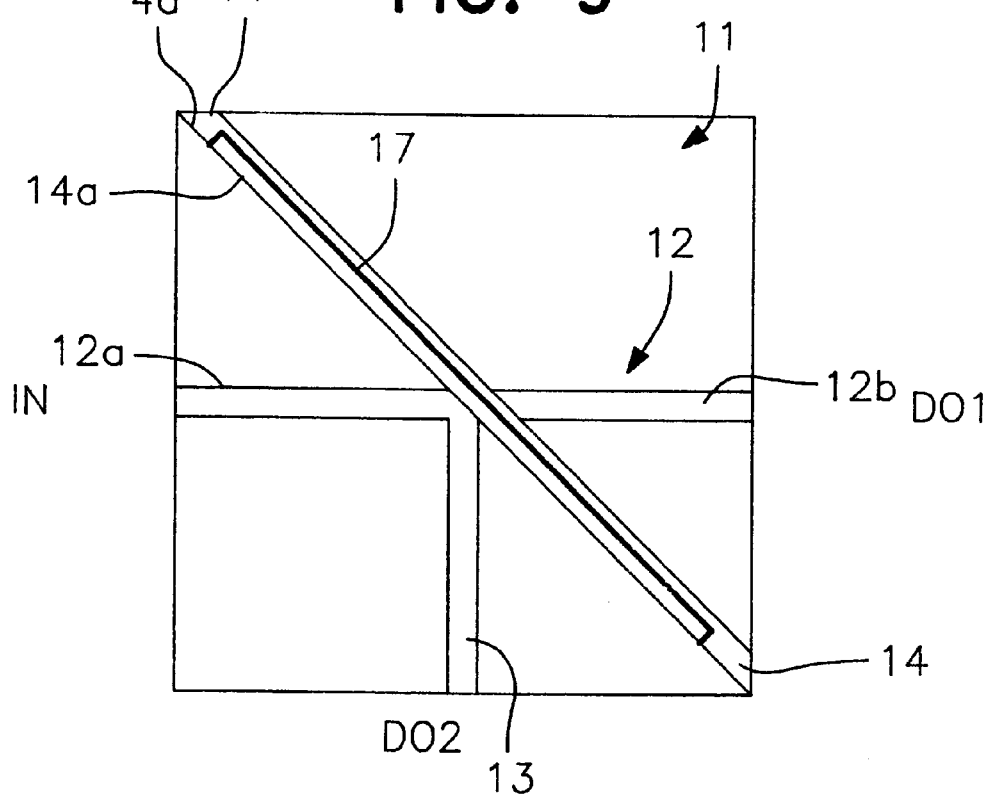
FIG. 9 is a plan view of the optical branched waveguide illustrated in FIG. 8.

FIGS. 8 and 9 are views of an optical branched waveguide according to a second embodiment of the optical branched waveguide according to the present invention, in which FIG. 8 is a perspective view and FIG. 9 is a plan view.

An optical branched waveguide 10A illustrated in FIG. 8 and FIG. 9 comprises the optical branched waveguide 10 illustrated in FIG. 4 and FIG. 5 as the first embodiment to which is adhered a partial reflection and partial transmission film 17 in place of the partial reflection and partial transmission film 15 inserted in the groove 14. The other parts are similar to those of the optical branched waveguide 10 of the first embodiment.

In the optical branched waveguide 10A of the second embodiment, two linear first optical waveguide 12 and second optical waveguide 13 are formed so as to intersect with each other at a predetermined angle, for example, a relatively large angle of for example several tens to 90 degrees with respect to the substrate 11 transparent to the used wavelength.

In the substrate 11, a groove 14 forming an angle of 45 degrees with the optical waveguide, having a width of about 30 μm, and having a depth set to not less than the depth of the first and second optical waveguides 12 and 13, for example, 10 μm or more, is formed so as to include the intersecting region of the first optical waveguide 12 and the second optical waveguide 13.

In the groove 14, an optical element 15 having a partial reflection and partial transmission function allowing part of the incident light guided through the first optical waveguide 12a to pass therethrough, guiding this to the first optical waveguide 12b, and, at the same time, reflecting part of the incident light and guiding the same to the second optical waveguide 13 is coated on one side surface 14a at least at the intersecting region of the first optical waveguide 12 and the second optical waveguide 13 in the groove 14.

One end surface of the first optical waveguide 12 faces a first side surface 11a of the substrate 11. The light incident portion is constituted by one end surface of this first optical waveguide 12. The other end surface of the first optical waveguide 12 faces a second side surface 11b of the substrate 11. One end surface of the second optical waveguide 13 intersects with part of the first optical waveguide 12a, while the other end surface of the second optical waveguide 13 faces a third side surface 11c of the substrate 11. The light emitting portion of the branched lights DO1 and DO2 is constituted by the other end surface of the first optical waveguide 12 and the other end surface of the second optical waveguide 13.

In the optical branched waveguide 10A shown in FIG. 8 and FIG. 9, the input waveguide is constituted by the left side part 12a of the groove 14 in the figure of the first optical waveguide 12, while the branched waveguide is constituted by the right side part 12b of the groove 14 in the figure of the first optical waveguide 12 and the second optical waveguide 13.

The groove 14 and the optical waveguides are formed so that the light reflection angle of the light incident from the first optical waveguide 12 due to the optical element 15 and the angle formed by the second optical waveguide 13 together with the first optical waveguide 12 coincide.

The process of production of the optical branched waveguide 10A will be explained next by referring to FIG. 10.

In this example, a case of using a polymer waveguide formed on a substrate as an optical waveguide is shown.

First, the silicon wafer substrate 11 is coated by spin coating or the like with a polymer having a lower refractive index than that of a core layer 122 as a cladding layer 121a and then a polymer of the core layer. The film thicknesses of the cladding layer and core layer are designed from the relationship of the final waveguide width and film thickness so that a single mode waveguide is obtained. For example, the thickness of the core layer is 2 μm, and the thickness of the cladding layer is 3 μm.

Resist patterns having a width of 3 to 6 μm, preferably 4 to 5 μm, intersecting in the form of a cross are formed on the core layer by a photolithographic process. This is processed by RIE in oxygen gas to etch only the core layer and thereby form a rectangularly shaped optical waveguide of the shape and width of the resist and the thickness of the core layer.

Thereafter, a cladding layer 121b is formed on the surface thereof again by spin coating or the like.

Next, a dicing saw with a metal blade of about 30 μm are used to form a groove 14 at an angle of 45 degrees with respect to the intersecting optical waveguides, perpendicular to the substrate, to a depth of 10 μm or more.

Next, the partial reflection and partial transmission film 17 comprising a thin optical film such as a multiple-layer interference film or metal film is formed on one side wall 14a of the groove 14 so as to obtain a desired optical branching ratio with respect to each optical waveguide. At the formation of this partial reflection and partial transmission film 17, as shown in FIG. 10, the partial reflection and partial transmission film 17 is formed on one side wall 14a of the groove 14 by inclining the optical waveguide substrate 11 and vapor depositing or sputtering a thin optical film such as a multiple-layer interference film or metal film.

Thereafter, a dicing saw is used to cut out the optical waveguide circuit in a rectangular shape including the intersecting point at right angles to the waveguides.

Note that, by etching the silicon substrate in advance to form a V-groove to be used for the connection of the optical fiber, it is possible to facilitate the positioning of the fiber and the reduction of the process for production of the parts and to simplify the connection process.

When producing the optical branched waveguides industrially, a net of optical waveguides intersecting at for example 1 mm is formed on the entire surface of a substrate of for example 3 inches square, then grooves 14 passing through the intersecting points of the optical waveguides and forming an angle of 45 degrees relative to the waveguides are formed over the entire surface.

Then, a partial reflection and partial transmission film 17 is formed on one side wall of the grooves by inclining the optical waveguide substrate and vapor depositing or sputtering a thin optical film such as a multiple-layer interference film or metal film.

Next, the result is adhered to a dicing use support film and cut by a dicing saw in straight lines passing through the intermediate points of the lattice at right angles (in parallel) to the waveguides to obtain a large number of optical branched waveguides.

For forming the partial reflection and partial transmission film 15, use is made of the technology for preparing a half mirror in a spatial optical system.

Note that the above process is one example of the preparation of the present device. Even if the order of the affixment is changed or the method of coating the binder, the material of the waveguides, and the method of forming the waveguides are changed according to the respective materials and desired specifications, this does not detract from the gist of the present invention.

In the optical branched waveguide 10A produced as described above, the incident light IN is guided to the first optical waveguide 12a. This incident light is propagated through the first optical waveguide 12a and reaches the optical element 17 inserted in the groove 14.

In the optical element 15, part of the guided light passes through, is guided to the first optical waveguide 12b again, and is emitted from the other end surface thereof as the first branched light DO1.

Also, part or all of the remaining guided light is reflected at the optical element 17, guided to the second optical waveguide 13, and emitted from the other end surface thereof as the second branched light DO2.

As explained above, since, according to the present embodiment, two linear first and second optical waveguides 12 and 13 are formed so as to intersect with each other at a predetermined angle α with respect to the substrate 11 transparent to the used wavelength, a groove 14 which forms a predetermined angle relative to the optical waveguide and has a depth set to not less than the depth of the first and second optical waveguides 12 and 13 is formed so as to include the intersecting region of the first optical waveguide 12 and the second optical waveguide 13, and an optical element 17 which allows part of the incident light guided through the first optical waveguide 12*a* to pass therethrough and guides the same to the first optical waveguide 12*b* and, at the same time, reflects part of the incident light and guides the same to the second optical waveguide 13 is formed on one side wall 14*a* of the groove 14 so as to include at least the intersecting region of the first optical waveguide 12 and the second optical waveguide 13 in the groove 14, a complex and tapered optical waveguide part and a large radius curved waveguide part as in a Y-branch waveguide are not required, the optical output end portion is separated so that the optical fiber can be connected, and the shape becomes smaller compared with the parts of the related art.

Further, if the groove for forming the reflection film has a width of about 30 μm, the width of the waveguide is 5 to 10 μm, and the diameter of the optical fiber is 125 μm, even considering the workability, parts of not more than 1 mm square can be obtained. As the limit, small sized parts of 125 μm square corresponding to the diameter of the optical fiber to be connected can be obtained.

The dimension becomes a size 1/100th or less of the branch substrate of the related art and the number of parts fabricated from one stock substrate becomes an inverse multiple thereof, therefore the cost per unit is greatly reduced.

The optical branched waveguide is fabricated with a relatively large intersecting angle, therefore the shape of the branch portion is relatively easily obtained.

Further, since the characteristics such as the loss and branching ratio depend upon the partial transmission and partial reflection film 17, management of the characteristics becomes easy.

Furthermore, the connection of the optical branched waveguide path 10 with the external circuits may be achieved by directly connecting an optical fiber or other waveguide at the side surface of the optical waveguide. Further, it is also possible to directly bond the light receiving element and light emitting element to an opening of the waveguide at the end surface of the substrate.

The substrate of the present embodiment is relatively small, therefore in order to facilitate handling, it is also possible to affix this substrate to a support substrate larger and cheaper than this substrate for supporting this substrate, make a V-groove in the support substrate, and connect the optical fiber or affix the light receiving element and light emitting element to the support substrate and affix the same to the waveguide. Of course, it is also possible to provide electrical wiring on the support substrate and use this as the light receiving and emitting unit.

Further, the present optical branched waveguide is naturally used in a 1×2 optical branched waveguide circuit providing the basic function, but can also be utilized in a 1×N optical branched waveguide circuit providing a plurality of this type of function on a substrate, an optical waveguide circuit combined with another optical waveguide circuit, and an optical functional device utilizing an electrooptic effect, piezoelectric effect, and surface elastic wave effect together with this.

Further, the most effective embodiment of this technology is the use as an optical 3 dB branch substrate comprising intersecting waveguides and a semi-transmission and semi-reflection film intersecting with them at 45 degrees.

In this case, the side to which the input and output optical fiber is connected forms an orthogonal or parallel rhomboid (rectangle) so connection of the optical fiber is easy.

Figure 11:
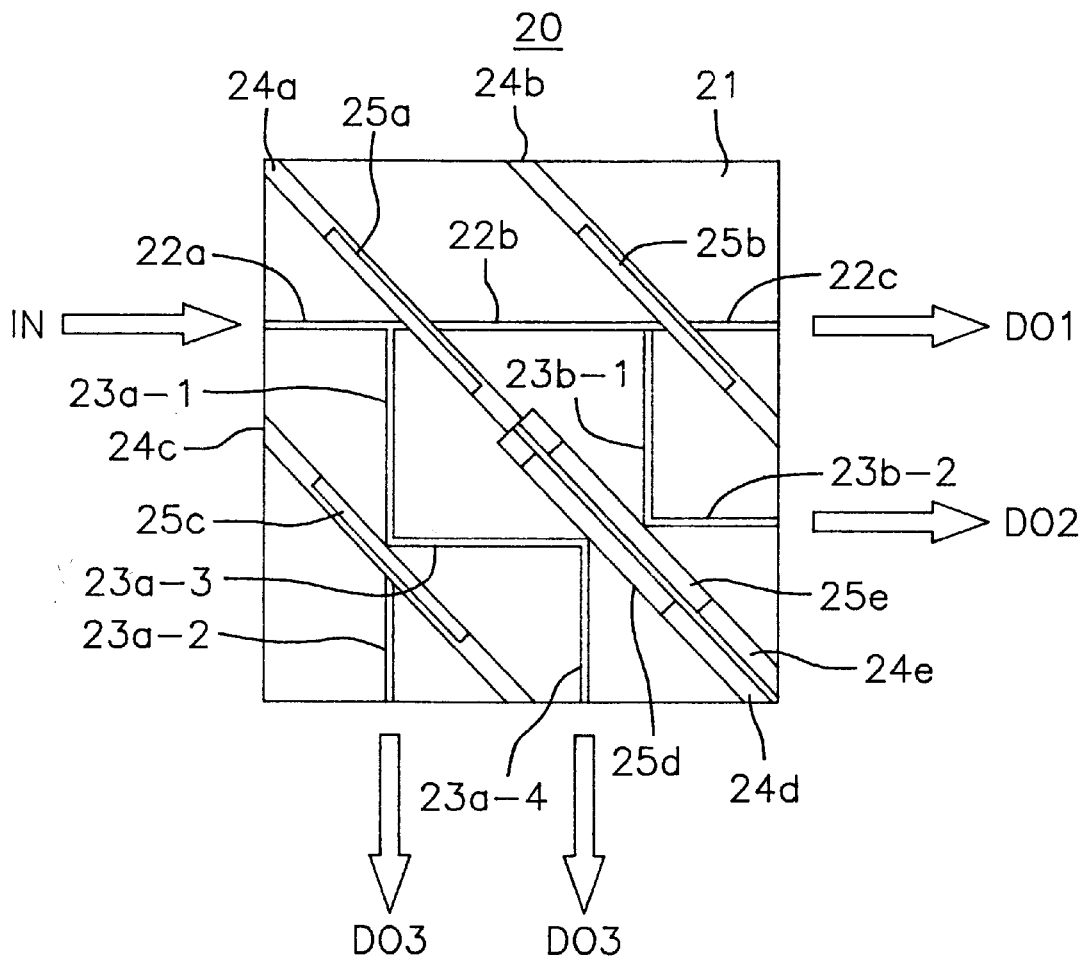
FIG. 11 is a plan view of the optical branched waveguide according to a first modification of the second embodiment of the present invention.
Figure 12:
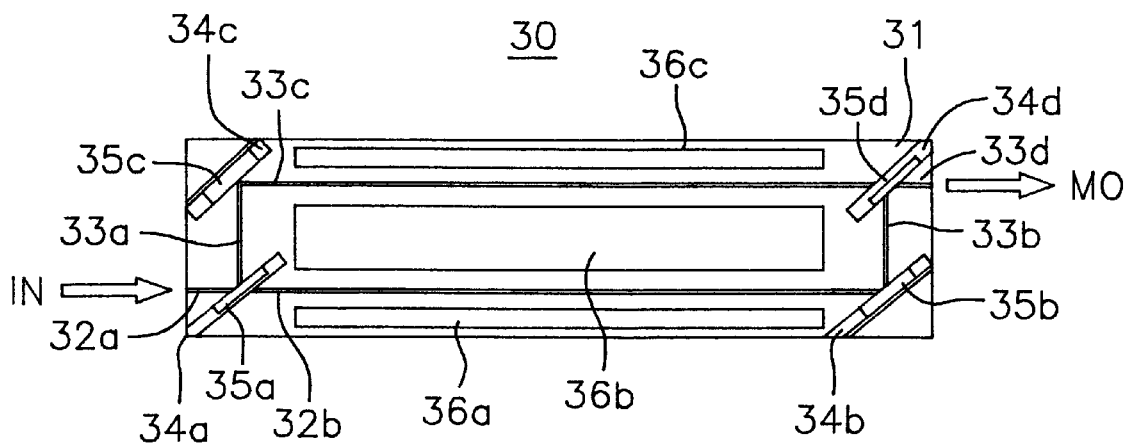
FIG. 12 is a plan view showing an example in which the optical branched waveguide as the second modification of the first embodiment of the present invention is applied to the Mach-Zehnder type optical modulator.

Note that, in the above embodiment, the description was made of a 1×2 optical branched waveguide, but for example a 1×4 optical branched waveguide 20 as shown in FIG. 11, a Mach-Zehnder type optical modulator 30 as shown in FIG. 12, or an optical waveguide circuit combining on one substrate another optical waveguide circuit of the related art can be constituted.

In the ¼ optical branched waveguide 20 shown in FIG. 11, 21 denotes a substrate, 22*a*, 22*b*, 22*c*, 23*a*-1, 23*a*-2, 23*a*-3, 23*a*-4, 23*b*-1, and 23*b*-2 denote optical waveguides, 24*a* to 24*e* denote grooves, 25*a* to 25*c* denote semi-transmission reflection films serving as optical elements, and 25*d* and 25*e* denote reflection films serving as optical elements. In this ¼ optical branched waveguide 20, the intersecting angle of the optical waveguide is 90 degrees and the grooves 24*a* to 24*e* are formed at angles of 45 degrees relative to the intersecting waveguides.

In this ¼ optical branched waveguide 20, the incident light IN is guided to the optical waveguide 22*a*. This incident light is propagated through the optical waveguide 22*a* and reaches the semi-transmission reflection film 25*a* serving as the optical element adhered to the groove 24*a*. In the semi-transmission reflection film 25*a*, part of the guided light passes through (goes straight ahead) and is guided to the optical waveguide 22*b*, and part or all of the remaining guided light is reflected and guided to the optical waveguide 23*a*-1.

The guided light passed through the semi-transmission reflection film 25*a* is propagated through the optical waveguide 22*b* and reaches the semi-transmission reflection film 25*b* adhered to in the groove 24*b*. In the semi-transmission reflection film 25*b*, part of the guided light passes through (goes straight ahead), is guided to the optical waveguide 22*c*, and is emitted from the other end surface thereof as the first branched light DO1.

Part or all of the remaining guided light of the optical waveguide 22*b* is reflected at the semi-transmission reflection film 25*b*, guided to the optical waveguide 23*b*-1, reaches the reflection film 25*e* inserted in the groove 24*e*, is reflected there, guided to the optical waveguide 23*b*-2, and emitted from the other end surface thereof as the second branched light DO2.

The light reflected at the semi-transmission reflection film 25*a* and guided to the optical waveguide 23*a*-1 reaches the semi-transmission reflection film 25*c* adhered to in the groove 24*c*.

At the semi-transmission reflection film 25*c*, part of the guided light passes through (goes straight ahead), is guided to the optical waveguide 23*a*-2, and is emitted from the other end surface thereof as the third branched light DO3.

Part or all of the remaining guided light of the optical waveguide 23*a*-1 is reflected at the semi-transmission reflection film 25*c*, guided to the optical waveguide 23*a*-3, reaches the reflection film 25*d* adhered to the groove 245*d*, is reflected there, guided to the optical waveguide 23*a*-4, and emitted from the other end surface thereof as the fourth branched light DO4.

As described above, by using the optical branched waveguide according to the present invention, a ¼ optical branched waveguide 20 having the advantages that a reduction of size can be realized, a high yield can be obtained by substantially the same process as that of the related art, the operating efficiency per one device of the equipment can be improved, and further the yield can be improved, and a reduction of cost can be realized can be constituted.

In the Mach-Zehnder type optical modulator 30 shown in FIG. 12, 31 denotes a substrate having for example an electro-optic effect, 32a, 32b, and 33a to 33d denote optical waveguides, 34a to 34d denote grooves, 35a and 35d denote semi-transmission reflection films serving as optical elements, 35b and 35c denote reflection films serving as optical elements, and 36a to 36c denote electrodes.

In this Mach-Zehnder type optical modulator 30 as well, the intersecting angle of the optical waveguide is 90 degrees, and the grooves 34a to 34d are formed at angles of 45 degrees relative to the intersecting waveguides.

In the Mach-Zehnder type optical modulator 30, the incident light IN is guided to the optical waveguide 32a. This incident light is propagated through the optical waveguide 32a and reaches the semi-transmission reflection film 35a serving as the optical element adhered to the groove 34a.

In the semi-transmission reflection film 35a, part of the guided light passes through (goes straight ahead) and is guided to the optical waveguide 32b, and part or all of the remaining guided light is reflected and guided to the optical waveguide 33a. The guided light passing through the semi-transmission reflection film 35a is propagated through the optical waveguide 32b and reaches the reflection film 35b adhered to in the groove 34b, is reflected there, guided to the optical waveguide 33b, propagated through the optical waveguide 33b, and reaches the semi-transmission reflection film 35d.

The light reflected at the semi-transmission reflection film 35a and guided to the optical waveguide 33a is propagated through the optical waveguide 33a and reaches the reflection film 35c adhered to in the groove 34c, is reflected there, guided to the optical waveguide 33c, propagated through the optical waveguide 33c, and reaches the semi-transmission reflection film 35d. At the semi-transmission reflection film 35d, part of the propagated light of the optical waveguide 33b is reflected and guided to the optical waveguide 33d, and part of the propagated light of the optical waveguide 33c passes through (goes straight ahead) and is guided to the optical waveguide 32d. The propagated light of the optical waveguide 33b and the propagated light of the optical waveguide 33c are combined.

In the Mach-Zehnder type optical modulator 30, a predetermined voltage is applied to for example the space between the electrode 36a and the electrode 36b or the space between the electrode 36c and the electrode 36b. By this, an electro-optic effect is manifested on the substrate 31, the refractive index of the optical waveguide 32b or the optical waveguide 33c changes, and a phase difference is given to the light branched into two at the semi-transmission reflection film 35a.

The two lights given this phase difference are combined at the semi-transmission reflection film 35d and emitted as the modulated light MO.

As described above, the Mach-Zehnder type optical modulator 30 can be constituted by using the optical branched waveguide according to the present invention.

Note that, in the embodiment explained above, the thin optical film is also formed on the surface of the optical waveguide substrate, but when the electrode 36 etc. are provided on the substrate surface as in the Mach-Zehnder type optical modulator of FIG. 12, there are cases where the thin optical film of the optical waveguide substrate surface must be removed. In such a case, the method of removal by wet type etching using chemicals or dry type etching by plasma as in the related art can be adopted, but in this case, there is a danger of damage to the waveguide substrate.

However, the thin optical film of the substrate surface can be reliably removed by the method shown below without inflicting damage to the waveguide substrate.

Namely, when forming the thin optical film by the vapor deposition or sputtering, a peelable film is formed on the surface of the substrate of the optical waveguide in advance.

Subsequently, after forming the groove, as shown in FIG. 13A, the thin optical film is formed on the side surface of the groove 14 by inclining the optical waveguide substrate 11 and vapor depositing or sputtering the film. Thereafter, as shown in FIG. 13B, the film on the surface of the optical waveguide substrate is peeled off and removed together with the thin optical film on this.

At this time, if for example a water-soluble organic film or the like is used as the film to be peeled, peeling by washing with water is possible and it becomes possible to remove the thin optical film without considering much at all the influence exerted upon the substrate.

As explained above, according to the present invention, the size can be made smaller compared with that of the optical branched waveguide of the related art and, in turn, a reduction of size of the optical waveguide parts can be realized. As a result, a high yield is obtained by substantially the same process as that of the related art, the operating efficiency per unit of the equipment is improved, and a reduction of cost can be realized.

Also, the degree of demand for uniformity of the process is lower compared with the branching of the related art due to the reduction of size, consequently the yield is improved and a reduction of cost can be realized also in this point.

Further, there are no sharp bent portions or curved portions, therefore the required precision of the photolithographic process is reduced and the costs can be reduced due to the reduction of the price of the equipment and the improvement of the yield.

Furthermore, the branch characteristic does not depend upon the complex shape of the waveguide, but depends upon the thin optical film fabricated in a separate process, therefore there are the advantages that the management of characteristics is easy and uniformity of characteristics and improvement of performances can be achieved.

Third Embodiment

The optical branched waveguide according to a third embodiment of the present invention will be explained next.

Figure 14:
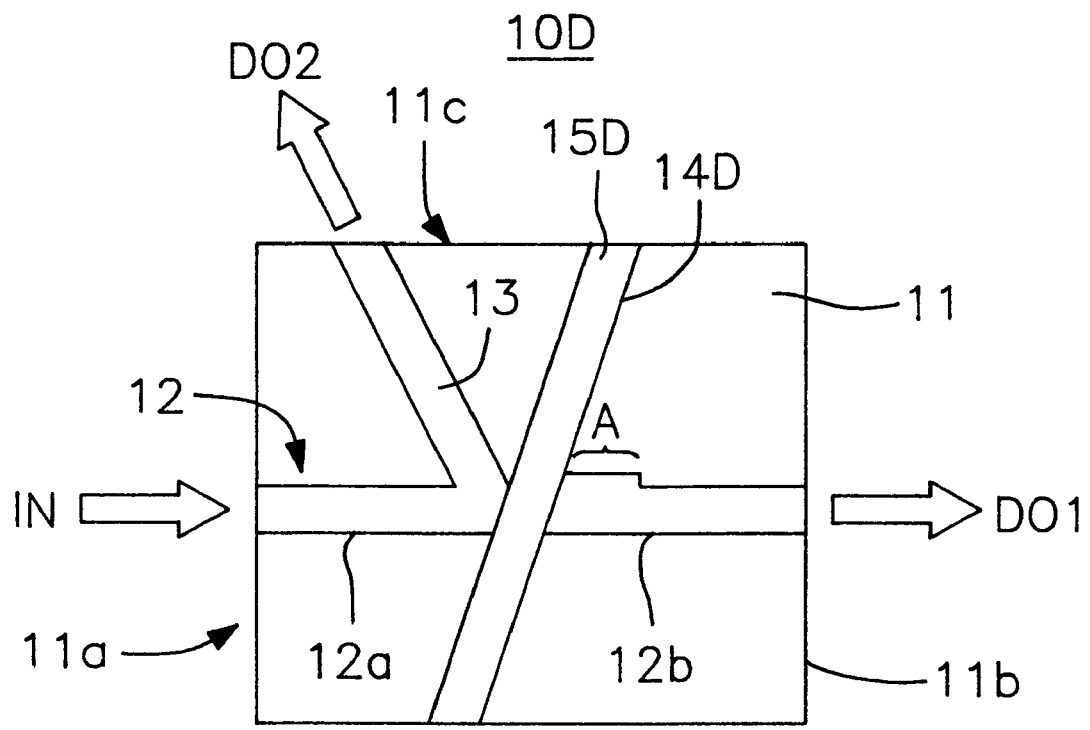
FIG. 14 is a plan view of the optical branched waveguide according to a third embodiment of the present invention.

FIG. 14 is a plan view of the branched waveguide according to a third embodiment of the present invention.

The optical branched waveguide 10D of the third embodiment is formed by crossing two first and second optical waveguides 12 and 13 of a linear shape at a predetermined angle, for example, a relatively large angle of from several tens to 90 degrees with respect to a substrate 11 transparent to the used wavelength.

The substrate 11 is formed with a groove 14D which forms a predetermined angle, e.g., 45 degrees, together with the optical waveguides so as to include the intersecting region of the first optical waveguide 12 and the second optical waveguide 13 and which has a width of about 30 μm and a depth of not less than the depth of the first and second optical waveguides 12 and 13, e.g., 10 μm or more.

The groove 14D has inserted into it an optical element 15D having a partial reflection and partial transmission function, which passes part of the incident light guided through the first optical waveguide 12a therethrough and guides the same to the first optical waveguide 12b and, at the same time, reflects part of the incident light and guides the same to the second optical waveguide 13, so as to include at least the intersecting region of the first optical waveguide 12 and the second optical waveguide 13 of the groove 14D. In the following description, the groove 14D contains all of the thin optical film and binder layer.

One end surface of the first optical waveguide 12 faces a first side surface 11a of the substrate 11. The light incident portion is constituted by one end surface of this first optical waveguide 12.

The optical branched waveguide 10 is constituted so that the other end surface of the first optical waveguide 12 faces the second side surface 11b of the substrate 11, one end surface of the second optical waveguide 13 intersects with part of the first optical waveguide 12a, and the other end surface of the second optical waveguide 13 faces the third side surface 11c of the substrate 11.

The light emitting portion is constituted by the other end surface of the first optical waveguide 12 and the other end surface of the second optical waveguide 13.

In the optical branched waveguide 10D shown in FIG. 14, the input waveguide is constituted by the left side part 12a of the groove 14 in the figure of the first optical waveguide 12, and the output waveguide is constituted by the right side part 12b of the groove 14 in the figure of the first optical waveguide 12 and the second optical waveguide 13.

In the first optical waveguide 12b, the width of a predetermined region A of the waveguide facing the groove 14D is set to be larger than the width of the first optical waveguide 12a and the waveguide not facing the groove 14.

In the first optical waveguide 12b, the wide width waveguide facing the groove 14D and the waveguide not facing the groove 14D are connected in the form of steps as shown in FIG. 14.

The width of the waveguide of the part in contact with the groove 14D is the width of the optical branch expanded from the dimension substantially corresponding to the refraction at the groove portion. An outer peripheral portion of the waveguide requires the optimum waveguide width so as to achieve a single mode connection with the optical fiber and light emitting and light receiving element, therefore the width of waveguide is changed in steps between them in FIG. 14.

In this way, by introducing the transmitted light into optical waveguide at one end at the light connection portion facing the groove 14D, the connection loss due to the deviation of the light axis can be greatly reduced.

Note that, the groove 14D and the optical waveguides are formed so that the light reflection angle of the light incident from the first optical waveguide 12 due to the optical element 15D and the angle exhibited by the second optical waveguide 13 together with the first optical waveguide 12 coincide.

The optical element 15D having the partial reflection and partial transmission function is configured by forming a thin optical film on an organic film transparent with respect to for example the guided light or configured by forming a thin optical film (semi-transmission reflection film) on a thin sheet made of an inorganic material transparent with respect to the guided light. The thin optical film is constituted by for example a multiple-layer interference film or metal film.

Figure 15:
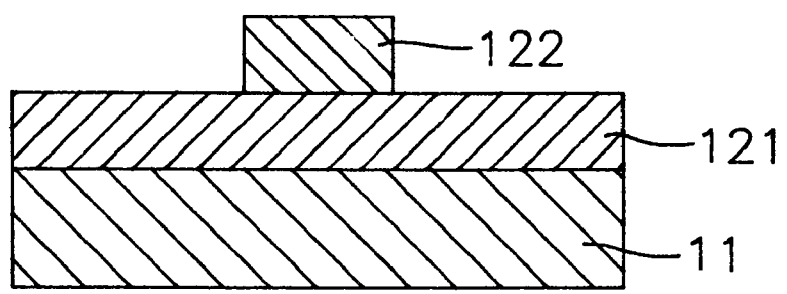
FIG. 15 is a view illustrating a method of production of the optical branched waveguide illustrated in FIG. 14.

Next, a simple explanation will be given of the process of production of the optical branched waveguide 10D by referring to FIG. 15.

Here, a case of using a polymer waveguide formed on the substrate 11 as the optical waveguide is shown.

The present optical branched waveguide 10D is constituted by coating polymer having a low refractive index acting as a buffer layer 12 of the optical waveguide on the silicone substrate 11, then coating a polymer having a high refractive index acting as a core layer 122. This polymer of a high refractive index is masked with a resist pattern by photolithography. A waveguide layer of a single mode optical waveguide having a waveguide width of a few micrometers is formed by dry etching such as reactive ion etching (RIE).

Thereafter, a polymer of a low refractive index is coated on the side surface and upper surface of the core layer 122 to prepare the optical waveguide circuit.

Thereafter, a groove of a width of several tens of micrometers for placing the thin optical film is formed by a dicing saw or the like. The thin optical film is affixed to this groove while filling the gap by a binder, and the outer periphery is formed so that it can be connected to an external fiber. The optical branched waveguide 10D is thereby completed.

OPI-N1605 made by Hitachi Kasei having a refractive index of 1.545 is utilized as the high refractive index polymer constituting the core layer 122, while OPI-N1405 made by Hitachi Kasei having a refractive index of 1.530 is utilized as the low refractive index polymer constituting the buffer layer 121.

The binder inserted and filled in the groove 14D is preferably a material having a refractive index not more than that of the buffer layer so as not to cause the waveguide mode in the groove direction.

The thin optical film is fabricated as a usual half mirror by forming a multiple-layer film such as a metal or dielectric on a film of a few micrometers.

There is the problem of the binder layer of a low refractive index occupying the majority of the groove in this structure. The guided light passing through the core layer refracts according to the laws of Snell in this binder layer, reaches the opposite part of the groove, and strikes the optical waveguide path again. At this time, the axis of the optical path due to refraction deviates from the original axis of the linear waveguide, and connection loss occurs at the incidence of the waveguide.

Figure 16:
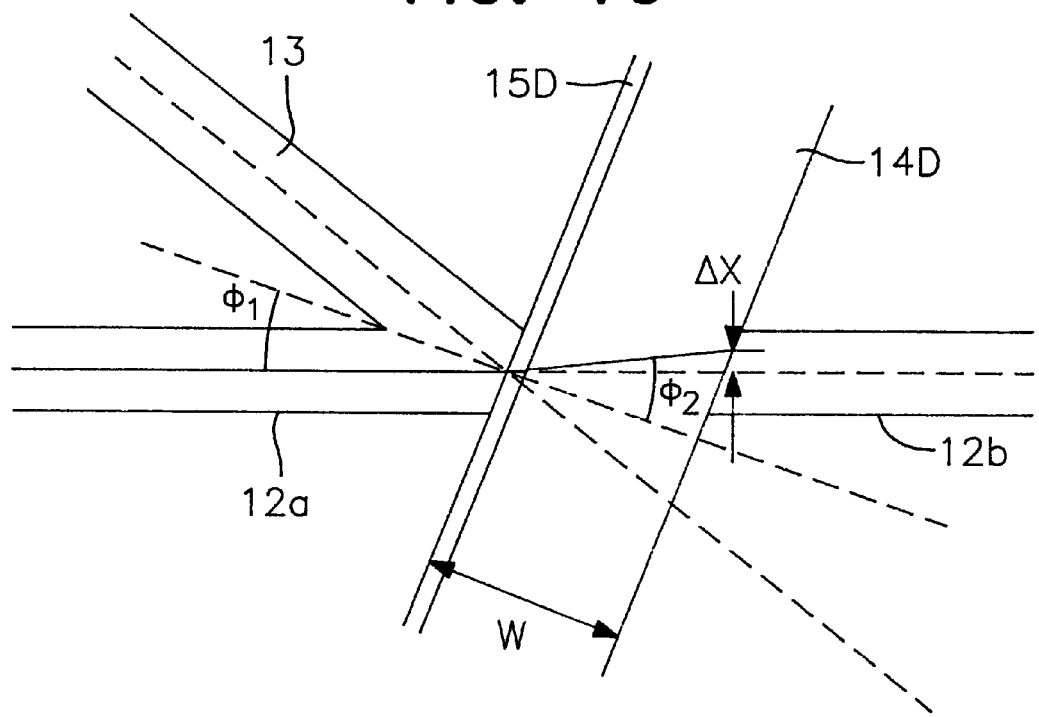
FIGS. 16 to 21 are views illustrating a modification of the third embodiment of the present invention.

The deviation of the light axis is geometrically found. In FIG. 16, the amount of movement Δx of the axis becomes that as shown in the following equation:

$$\Delta_x = w(\tan\emptyset_2 \cdot \cos\emptyset_1 - \sin\emptyset_1),$$

$$\emptyset_2 = \sin^{-1}(n_1 \sin\emptyset_1/n_2)$$

If the amount of movement of the light axis is found for a crossing waveguide branch where the average refractive index of the binder to be filled in the groove 14D and the thin optical film is set to 1.5 and $\emptyset_1 = 45°$, $\Delta_x$ becomes equal to 1.89 μm.

The single mode waveguide is about 5 μm. Deviation of the light axis increases the connection loss and is therefore inconvenient. In actual designs, the refractive index of the material to be filled in the groove is controlled, but it is difficult to completely eliminate this deviation.

Figure 19:
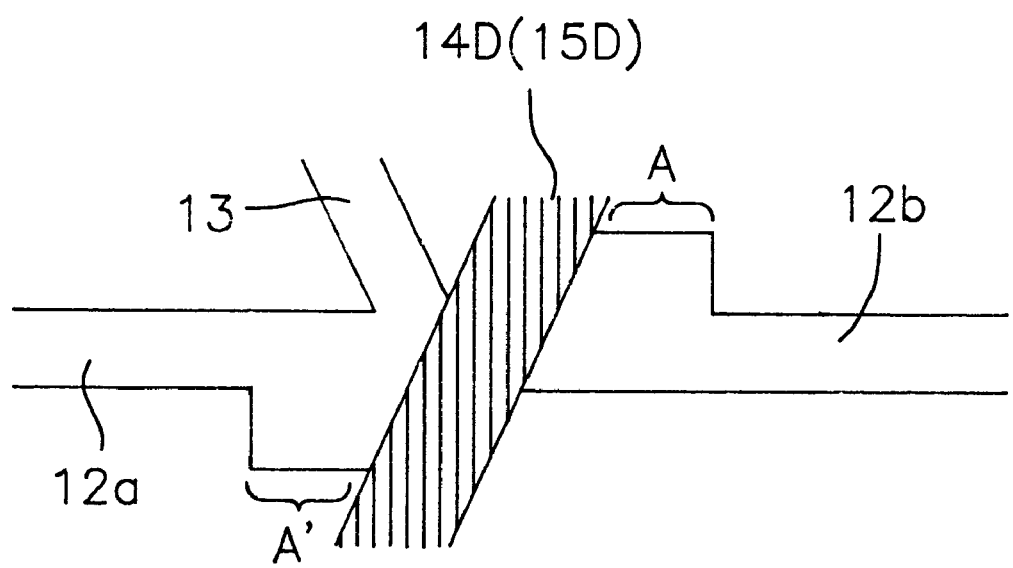

Therefore, the waveguide width of the part in contact with the groove 14D is set to the optical branch width obtained by expanding the dimension substantially corresponding to the refraction at the groove portion. The outer peripheral portion of the waveguide requires the optimum waveguide width for achieving the single mode connection with the optical fiber and the light emitting and light receiving element, therefore the waveguide width is changed in steps between them as in FIG. 19. In this way, by introducing the transmission light to the optical waveguide at one end in the light connection portion facing the groove 14D, the connection loss due to the deviation of the light axis is greatly reduced.

Note that by etching the silicon substrate in advance to form a V-groove to be used for the connection of the optical fiber, it is possible to facilitate the positioning of the fiber and the shortening of the process for fabrication of the parts and to simplify the connection process.

When producing the optical branched waveguides industrially, a net of optical waveguides intersecting at for example 1 mm is formed on the entire surface of a substrate of for example 3 inches square, then grooves passing through the intersecting points of the optical waveguides and forming an angle of 45 degrees relative to the waveguides are formed over the entire surface. Then, thin and long semi-transmission reflection film ribbons are inserted into the grooves and affixed there by bonding. The result is adhered to the dicing use support film and cut by a dicing saw in straight lines passing through the intermediate points of the lattice at right angles (in parallel) to the waveguides to obtain a large number of optical branched waveguides.

Further, the partial reflection and partial transmission film 15D can be formed by vapor depositing a thin optical film such as a multiple-layer interference reflection film on for example a polyimide film or glass film by sputtering or other film formation techniques.

For forming the partial reflection and partial transmission film, use is made of the technology for preparing a half mirror in a spatial optical system.

Note that the above process is one example of the preparation of the present device. Even if the order of the affixment is changed or the method of coating the binder, the material of the waveguides, and the method of forming the waveguides are changed according to the respective materials and desired specifications, this does not detract from the gist of the present invention.

As illustrated in FIG. 14, in the optical branched waveguide 10D produced as described above, the incident light IN is guided to the first optical waveguide 12a. This incident light is propagated through the first optical waveguide 12a and reaches the optical element 15D inserted in the groove 14D.

In the optical element 15D, part of the guided light passes through, is guided to the first optical waveguide 12b again, and is emitted from the other end surface thereof as the first branched light DO1. Part or all of the remaining guided light is reflected at the optical element 15, guided to the second optical waveguide 13, and emitted from the other end surface thereof as the second branched light DO2. At this time, the width of the waveguide 12b facing the groove 14D is made large, therefore the deviation of the optical path due to the refraction of the optical path is reduced. Even after passing through the thin optical film 15D and the groove space, the light is efficiently introduced into the subsequent optical waveguide 12b or the optical waveguide 13 for guiding the light after reflection at the thin optical film.

As explained above, since, according to the present embodiment, two linear first and second optical waveguides 12 and 13 are formed so as to intersect with each other at a predetermined angle with respect to a silicon substrate 11 a groove 14 which forms a predetermined angle relative to the optical waveguide and has a depth set to not less than the depth of the first and second optical waveguides 12 and 13 is formed so as to include the intersecting region of the first optical waveguide 12 and the second optical waveguide 13, and an optical element 15D which allows part of the incident light guided through the first optical waveguide 12a to pass therethrough and guides the same to the first optical waveguide 12b and, at the same time, reflects part of the incident light and guides the same to the second optical waveguide 13 is inserted into the groove 14D so as to include at least the intersecting region of the first optical waveguide 12 and the second optical waveguide 13 of the groove 14D, a complex and tapered optical waveguide part and a large radius curved waveguide part as in the Y-branch waveguide are not required, the optical output end portion is separated so that the optical fiber can be connected, and the shape becomes smaller compared with the parts of the related art.

Further, in the optical branched waveguide 10D, the width of the waveguide of the part A of the optical waveguide 12b of the part for forming the groove 14D into which the thin optical film 15D of the intersecting linear waveguides is inserted is set larger than that of the other parts, therefore the deviation of the optical path due to the refraction of the optical path can be reduced. Even after passing through the thin optical film support and groove space, the light is efficiently introduced into the subsequent optical waveguide or the optical waveguide for guiding the light after reflection by the thin optical film. As a result, there is the advantage that the optical loss can be reduced.

If the groove 14 for inserting the reflection film 15D has a width of about 30 $\mu$m, the width of the waveguide is 5 to 10 $\mu$m, and the diameter of the optical fiber is 125 $\mu$m, even considering the workability thereof, parts of not more than 1 mm square can be obtained. As a limit, small size parts of 125 $\mu$m square corresponding to the diameter of the optical fiber to be connected can be obtained. Namely, the dimensions of the optical branched waveguide 10D becomes a size of 1/100th or less of the branch substrate of the related art, and the number of parts fabricated from one stock substrate becomes an inverse multiple thereof, thus the cost per unit is greatly reduced.

Also, since the optical branched waveguide 10D is fabricated with a relatively large intersecting angle, the shape of the branch portion is relatively easily obtained.

Further, characteristics such as the loss and branching ratio depend upon the partial transmission and partial reflection film 17, therefore management of the characteristics becomes easy.

Furthermore, the connection with the external circuit may be achieved by directly connecting an optical fiber as described above. Further, it is also possible to directly bond the light receiving element and light emitting element to an opening of the waveguide of the end surface of substrate.

The substrate of the present embodiment is relatively small, therefore in order to facilitate handling, it is also possible to affix this substrate to a support substrate larger and cheaper than this substrate for supporting this substrate, make a V-groove in the support substrate, and connect the optical fiber or affix the light receiving element and light emitting element to the support substrate and affix the same to the waveguide. Of course, it is also possible to provide electrical wiring on the support substrate and use this as the light receiving and emitting unit.

Further, the present optical branched waveguide is naturally used in a 1×2 optical branched waveguide circuit providing the basic function, but can also be utilized in a 1×N optical branched waveguide circuit providing a plurality of this type of function on a substrate, an optical waveguide circuit combined with another optical waveguide circuit, and an optical functional device utilizing an electro-optic effect, piezoelectric effect, and surface elastic wave effect together with this.

Figure 17:
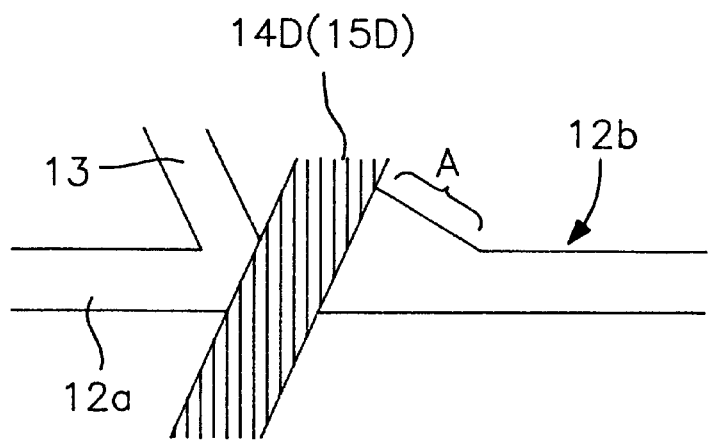
Figure 18:
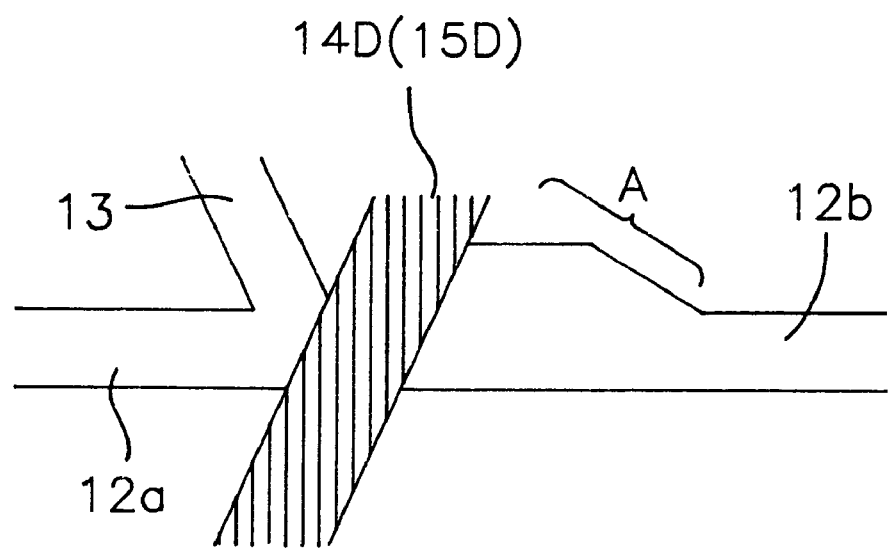

In the above embodiment, the explanation was made by taking as an example a case where a waveguide having a wide width facing the groove 14 and a waveguide not facing the groove were connected while changing the width in steps, but for example, as shown in FIG. 17 or FIG. 18, it is also possible to connect them while changing the width of the waveguides in the form of a taper. In this case as well, similar effects to the above effects can be obtained.

The increase of the width of the waveguide mentioned above can also be applied to the waveguides at both sides of the groove 14D for transmission of light from an inverse direction.

Figure 20:
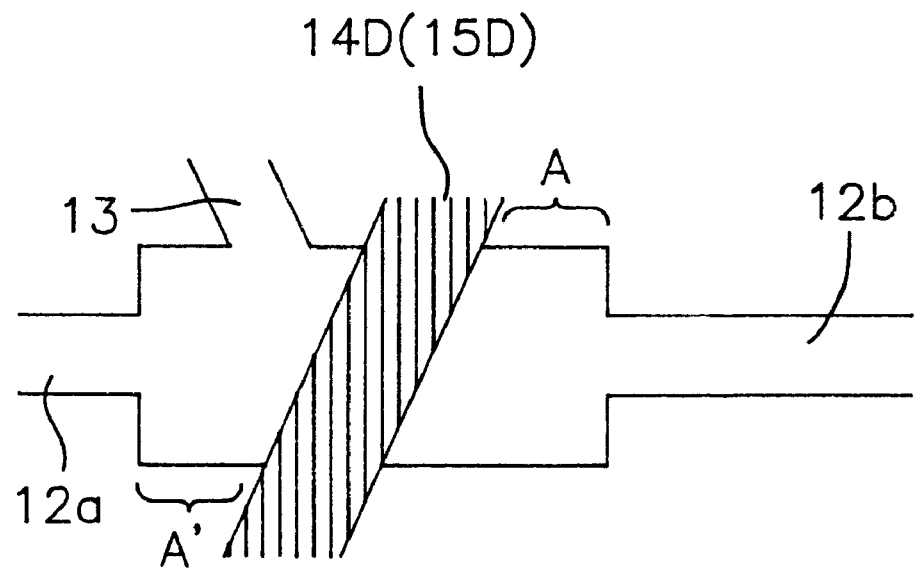

Further, in order to secure symmetry of the waveguides, it is also possible to spread both sides of the waveguide as shown in FIG. 20.

Further, in the embodiment explained above, the width of the waveguide facing the groove 14D was set larger than the width of the waveguide of the other part, but the present invention is not limited to this.

Figure 21:
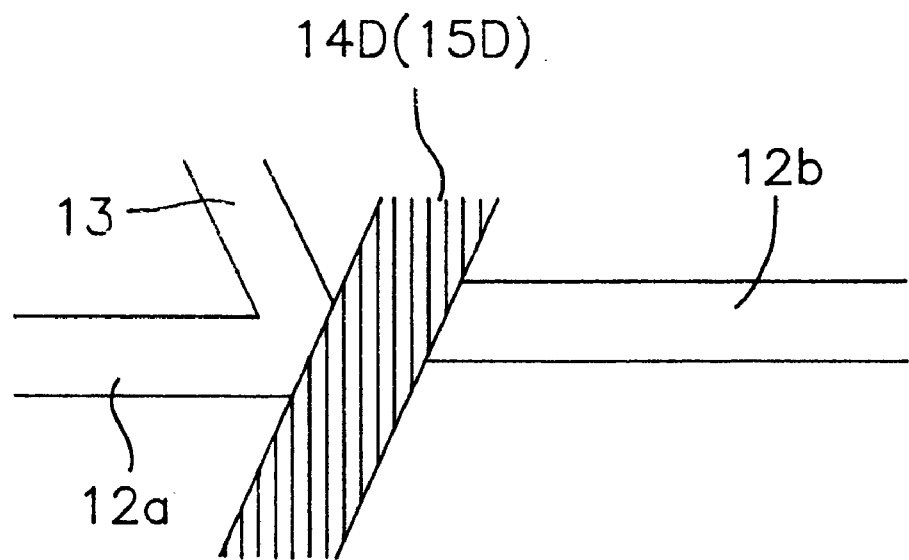

For example, as shown in FIG. 21, it is also possible to adopt a structure in which the light axis of the first optical waveguide 12b serving as the output waveguide is moved in parallel by exactly a dimension corresponding to the deviation of the light axis due to the member of the groove portion with respect to the light axis of the first optical waveguide 12a serving as the input waveguide sandwiching the groove. In this case, the light axis of transmission of the input guided light is refracted at the groove member, then coincides with the light axis of the output waveguide sandwiching the groove 14D, therefore connection loss due to deviation of the light axis does not occur. In this case as well, it is also possible to make the width of the front end portion of the optical waveguide in contact with the groove 14D wider so as to reduce the movement of the light axis due to fluctuation of the refractive index of the groove member.

As explained above, according to the present invention, the size can be made smaller compared with the optical branched waveguide of the related art, consequently a reduction of size of the optical waveguide parts can be realized. As a result, a high yield is obtained by substantially the same process as that of the related art, the operating efficiency per unit of the equipment is improved, and a reduction of cost can be realized.

Also, the degree of demand for uniformity of the process is lower compared with the branching of the related art due to the reduction of size, consequently the yield is improved and a reduction of cost can be realized also in this point.

Further, there are no sharp bent portions or curved portions, therefore the required precision of the photolithographic process is reduced and the costs can be reduced due to the reduction of the price of the equipment and the improvement of the yield.

Furthermore, the branch characteristic does not depend upon the complex shape of the waveguide, but depends upon the thin optical film fabricated in a separate process, therefore there are the advantages that the management of characteristics is easy and uniformity of characteristics and improvement of performances can be achieved.

Further, according to the present invention, deviation of the optical path due to the refraction of the optical path can be reduced. Even after passing through the thin optical film support and the groove space, the light is efficiently introduced into the subsequent optical waveguide or the optical waveguide for guiding the light after reflection at the thin optical film. As a result, there is the advantage that the optical loss can be reduced.

Fourth Embodiment

A fourth embodiment of the present invention will be explained below referring to FIGS. 22 and 23.

Figure 22:
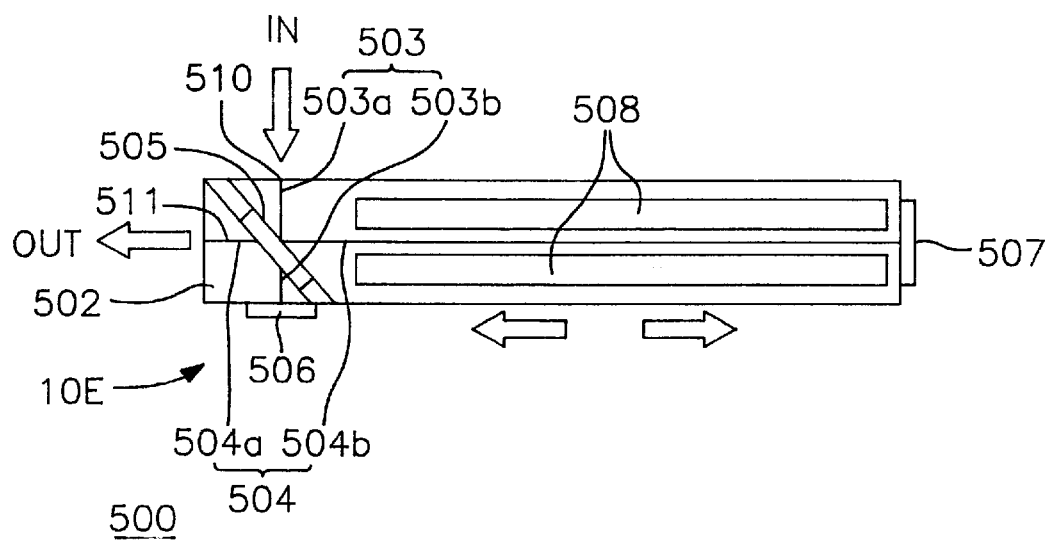
FIGS. 22 and 23 are a plan view and a perspective view of the optical branched waveguide according to a fourth embodiment of the present invention.

FIG. 22 is a plan view of an optical modulator according to the fourth embodiment of the present invention.

Figure 23:
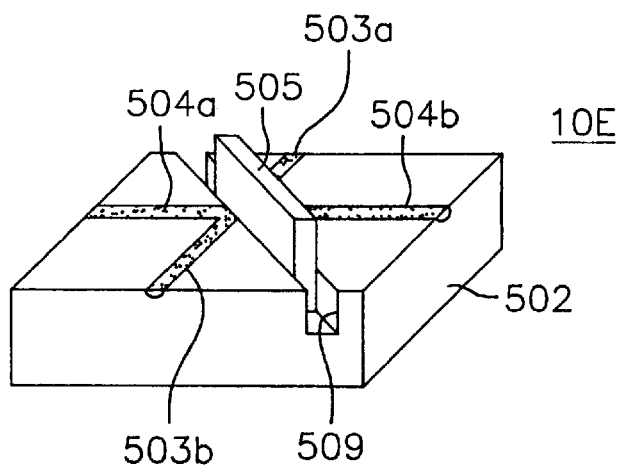

FIG. 23 is a perspective view of an optical branched waveguide portion 10E of the optical modulator shown in FIG. 22.

The explanation will be given of the structure of an optical modulator 500.

In the optical modulator 500, on the same plane of a substrate 5022, a linear first optical waveguide 503 and second optical waveguide 504 made of electro-optic materials are formed. The first optical waveguide 503 and the second optical waveguide 504 intersect at 90°. The first optical waveguide 503 and the second optical waveguide 504 are respectively divided into two parts 503a and 503b, and 504a and 504b by a partial transmission and partial reflection film 505 mentioned later. Further, the end portion of a first part 503a of the first optical waveguide 503 is used as a light incidence opening 510, while the end portion of a second part 504b of the second optical waveguide 504 is used as a light emitting opening 511.

At the intersecting portion of the first optical waveguide 503 and the second optical waveguide 504, the partial transmission and partial reflection film 505 for reflecting part of the incident light and passing part therethrough is provided. The partial transmission and partial reflection film 505 allows part of the light which was made incident upon the first optical waveguide 503 and guided through the first part 503a thereof to pass therethrough and makes the same incident upon the second part 503b of the first optical waveguide 503 and reflects part of the light and makes this incident upon the second part 504b of the second optical waveguide 504. Further, it reflects and transmits part of the light which was reflected at a first full reflection film 506 and a second full reflection film 507 mentioned later and guided through the second part 503b of the first optical waveguide 503 and part of the light guided through the second part 504b of the second optical waveguide 504 therethrough and makes the two lights strike the first part 504a of the second optical waveguide 4.

A detailed explanation will be given next of the partial transmission and partial reflection film 505 by referring to FIG. 23.

At the intersecting portion of the first optical waveguide 503 and second optical waveguide 504 of the substrate 502, a groove 509 forming an angle of 45° with these two optical waveguides 503 and 504, having a width of about 30 μm, and having a depth not less than the depth of the first optical waveguide 503 and the second optical waveguide 504 (10 μm or more in the present embodiment) is formed. The groove 509 has inserted in it the partial transmission and partial reflection film 505 reflecting part of the incident light and passing part therethrough.

This partial transmission and partial reflection film 505 is constituted by forming a semi-transmission reflection thin optical film on an organic film transparent with respect to the guided light or forming a similar thin optical film on a thin sheet made of an inorganic material transparent with respect to the guided light.

Note that, the thin optical film is constituted by for example a multiple-layer interference film or metal film.

End surfaces of the second parts 503b and 504b of the first optical waveguide 503 and the second optical waveguide 504 on sides different from the light incident opening and light emitting opening are provided with the first full reflection film 506 and the second full reflection film 507 for reflecting the propagated light to the interior of the waveguide again.

Note that a Michelson type optical interferometer is constituted by the first optical waveguide 503, second optical waveguide 504, partial transmission and partial reflection film 505, first full reflection film 506, and second full reflection film 507.

The second part 504b between the partial transmission and partial reflection film 505 of the second optical waveguide 504 and the second full reflection film 507 is provided with an electrode 508 for applying an electric field to the second optical waveguide 504.

By applying a voltage based on any modulation signal to the electrode 508, applying an electric field to the electrode 508, and changing the phase of the propagated light reciprocating in the second optical waveguide 504 by the electro-optic effect, the intensity of the interference light due to the reflection light between the two optical paths which passes through the first part 504a of the second optical waveguide 504 via the partial transmission and partial reflection film 505 and is emitted from the same can be electrically controlled. A device having such a structure can be made to operate as an optical modulator.

The operation of optical modulation using the optical modulator 500 having such a structure will be explained together.

The light incident from the light incident opening 510 of the first optical waveguide 3 is guided through the first part 503a of the first optical waveguide 503 and strikes the partial transmission and partial reflection film 505.

At the partial transmission and partial reflection film 505, part of the light passes through. At the same time, the partially reflected light of that film is guided to the second part 504b of the second optical waveguide 504. The input light is therefore effectively branched. The branched light is propagated through the waveguides, and then reflected at the full reflection mirrors 506 and 507 disposed at the ends of the waveguides and returned to the waveguides again.

The returned light is reflected or transmitted again by the partial transmission and partial reflection 505, propagated through the first part 504a of the second optical waveguide 504 while interfering to each other, and emitted from the light emitting port 511 of the end of the waveguide as the output light.

At this time, in the second part 504b of the second optical waveguide 504, when an electric field is applied to the electrode 508 disposed between the partial transmission and partial reflection film 505 and the second full reflection film 507, the phase of the light propagated through the waveguide changes due to the electro-optic effect. By this, the intensity of the interference light propagated through the first part 504a of the second optical waveguide path 504 changes in accordance with this phase change. Accordingly, by applying an electric field based on the desired modulation signal to this electrode 508, modulation of light becomes possible and the device acts as an optical modulator.

In this way, in the optical modulator 1 of the present embodiment, a complex and tapered optical waveguide part and large radius curved waveguide part of a branched waveguide as the optical modulator of the related art are not required, therefore the shape becomes much smaller compared with that of the parts of the related art.

Specifically, regarding the length of the substrate, since a length of about 1 to 2 mm is sufficient for the branch portion using the partial transmission and partial reflection film 505, the length of the electrode 508 for phase control occupies the majority of the space and the entire length of the substrate becomes 20 mm or less. Also, the width of the substrate can be reduced to 3 mm or less or thinner than that of the related art since the entire length of the substrate becomes short and one waveguide is sufficient for the electrode.

Due to the above, the size of the substrate becomes ¼ or less of that of the related art.

Further, since the size of the element becomes ¼ or less of that of the related art, the number of parts produced from one stock substrate becomes about four times that of the past when simply calculated and the cost per unit can be greatly reduced.

Further, the two waveguides constituting the branch portion have a relatively large intersecting angle (90° in the optical modulator 500 of the present embodiment), therefore the branch portion can be easily produced.

Further, since the characteristics of parts such as the loss and branching ratio depend upon the partial transmission and partial reflection film, the management of the characteristics becomes easy.

Note that since the present embodiment device is small, in order to facilitate handling, it is also possible to affix this device to a support substrate larger and cheaper than this substrate and make a V-groove in the support substrate to connect the fiber or to affix the light receiving element and light emitting element to the support substrate and connect this to the waveguide. Further, it is also possible to directly connect the optical fiber for the connection to the external portion, and further it is also possible to directly bond the light receiving element and light emitting element to the opening of the waveguide of the end surface of the substrate.

Next, an explanation will be made of the process of production of this optical modulator 1 by explaining two specific examples.

As a first example, an explanation will be given of a case where the optical modulator 500 is produced by using a lithium niobate (LiNbO$_3$) substrate.

1. Two intersecting single mode linear waveguides are formed on a lithium niobate (LiNbO$_3$) substrate by a Ti thermal diffusion method.

2. A groove intersecting with the intersecting optical waveguides at an angle of 45°, perpendicular to the substrate, and having a depth of 10 $\mu$m or more is formed in this intersecting portion by using a dicing saw with a metal blade having a thickness of 30 $\mu$m.

3. A partial reflection and partial transmission film comprised of a thin optical film such as a multiple-layer interference film or metal film for obtaining a desired optical branching ratio with respect to each optical waveguide is formed in that groove. This partial reflection and partial transmission film is formed by inserting a film obtained by forming a partial reflection and partial transmission film on a thin piece of lithium niobate (LiNbO$_3$) crystal into the provided groove.

4. A dicing saw is used to cut out a rectangular region at right angles to the waveguide and including an intersecting point as a modulator substrate.

5. Finally, full reflection films comprising thin dielectric films or thin metal films are formed on one of the end surfaces of the waveguides of each of the intersecting waveguides. At the same time, an electrode for applying an electric field is formed in one waveguide.

Note that, the space between the partial reflection and partial transmission film in this groove and the optical waveguide is filled with an agent for adjusting the refractive index having a refractive index equivalent to that of the lithium niobate substrate.

The optical modulator of the present embodiment can be produced in this way.

Next, as a second example, an explanation will be given of a case where a nonlinear organic waveguide formed on a silicon substrate is used as an optical waveguide.

a. A silicon wafer on which a lower electrode layer is formed is coated by spin coating etc. with a polymer having a lower refractive index than that of the core layer as the cladding layer and coated with a nonlinear organic polymer of the core layer. The thickness of each film is controlled based on the relationship of final waveguide width and film thickness so that a single mode waveguide is obtained. In the present embodiment, the thickness of the core layer is 2 μm and the thickness of the cladding layer is 3 μm.

b. A resist patterning having a width of 3 to 6 μm, preferably 4 to 5 μm, is formed on this intersecting in the form of the cross by photolithography.

c. This is processed by the RIE in oxygen gas to etch only the core layer and form an optical waveguide having a rectangular shape having the shape and width of the resist and the thin film of the core layer.

d. A cladding layer is formed on the surface thereof again by spin coating or the like.

e. An upper electrode layer is formed on one cladding layer so as to sandwich the core layer together with the lower electrode layer.

f. Thereafter, this intersecting portion is formed by a dicing saw with a metal blade having a thickness of 30 μm with a groove 509 at the angle of 45° with the intersecting optical waveguides, perpendicular to the substrate 502, and having a depth of 10 μm.

g. The groove 509 is formed with a partial reflection and partial transmission film 505 comprised of a thin optical film such as a multiple-layer interference film or metal film for obtaining a desired optical branching ratio with respect to each optical waveguide. This partial reflection and partial transmission film is formed by inserting a ribbon-like partial reflection and partial transmission film 505 into the groove 509 and affixing it by using a transparent binder so that the film is tightly affixed to the cut surface.

h. A dicing saw is used to cut out a rectangular part at right angles to the waveguide containing an intersecting point as the modulator substrate.

i. Finally, full reflection films comprised of thin dielectric films or thin metal films are formed on one of the end surfaces of the waveguides of each of the intersecting waveguides. At the same time, an electrode for applying an electric field is formed in one waveguide.

The optical modulator of the present embodiment can be produced in this way.

Note that, by etching the Si substrate in advance to form a V-groove used for the fiber connection, the positioning of the fiber is facilitated and the reduction of the steps for preparation of the parts and simplification of the connection process become possible, so this is also possible.

Note that the optical modulator of the present invention is not limited to the examples of the present embodiment. Various modifications are possible.

For example, in the optical modulator 500 of the present embodiment, the first optical waveguide 503 and the second optical waveguide 504 intersect at an angle of 90° and the partial transmission and partial reflection film 505 was provided so as to intersect with these optical waveguides at 45°, but the present invention is not limited to this. It is advantageous from the ease of production if two waveguides intersect at such a relatively large angle near 90°, but they can intersect at any angle. Further, the partial transmission and partial reflection film 505 is set to an angle so that the reflected light of the light propagated through one waveguide and striking it suitably strikes the other waveguide and is set by the arrangement of the first optical waveguide 503 and the second optical waveguide 504.

Further, the method of forming the partial reflection and partial transmission film at the intersecting part of the two optical waveguides may be any method. For example, a method of inserting a film obtained by forming a partial reflection and partial transmission film on a thin piece of lithium niobate ($LiNbO_3$) crystal into the groove can also be adopted. Further, it is also possible to form the partial reflection and partial transmission film by forming the partial reflection and partial transmission film on one side wall of the groove by inclining the optical waveguide substrate and vapor depositing or sputtering a thin optical film such as a multiple-layer interference film or metal film, then filling an agent for adjustment of the refractive index having a refractive index equivalent to that of the lithium niobate ($LiNbO_3$) substrate.

As the partial reflection and partial transmission film, various members usually used as a half mirror in a spatial optical system can be used too. Of course, it is also possible to fabricate and form this by the same method as that for a half mirror.

Further, the material of the waveguide can also be changed in any way.

Furthermore, the process of production of the optical modulator of the present invention is not limited to the above two examples. The order of the steps, the film forming method of the partial reflection and partial transmission film, the method of forming the waveguide, etc. can be freely changed.

As explained above, according to the optical modulator of the present invention, a long length and large sized Y-branch waveguide is not used. Instead, use is made of a branch waveguide for dividing input light into reflected light and transmitted light by providing an optical semi-transmission film at an intersecting portion of two optical waveguides. Therefore, a great reduction of size of the optical modulator becomes possible. Further, by this, many optical modulators can be obtained from one wafer by a single series of production steps even though the process is substantially the same as that of the related art, the operating efficiency per unit of equipment is improved, and a reduction of costs can be realized. Further, the degree of demand for uniformity of the process can be made lower than that of the related art by the reduction of size of the device, therefore the yield is improved and a further reduction of cost becomes possible.

Further, the optical branched waveguide of the present invention does not have any sharp bent portions or curved portions, therefore the required precision of the processing is reduced and therefore the fabrication becomes easy compared with the optical modulator of the related art.

Further, by this, the yield is improved, and in addition, production by lower price equipment becomes possible, therefore the cost is reduced also in this point.

We claim:

1. An optical branched waveguide comprising:
   a substrate;
   a first optical waveguide formed on the substrate;
   a second optical waveguide formed on the substrate so as to intersect with the first optical waveguide at a predetermined angle; and
   an optical element which is provided at an intersecting region of the first optical waveguide and the second optical waveguide, allows part of an incident light guided through the first optical waveguide to pass therethrough and guides it to the first optical waveguide, and reflects part of the incident light and guides it to the second optical waveguide.

2. An optical branched waveguide comprising:

a substrate;

a first optical waveguide formed on the substrate;

a second optical waveguide formed on the substrate so as to intersect with the first optical waveguide at a predetermined angle;

a groove formed in at least the intersecting region of the first optical waveguide and the second optical waveguide of the substrate; and an optical element which is inserted into at least the intersecting region of the first optical waveguide and the second optical waveguide in the groove, allows part of the incident light guided through the first optical waveguide to pass therethrough and guides it to the first optical waveguide, and reflects part of the incident light and guides it to the second optical waveguide.

3. An optical branched waveguide as set forth in claim 2, wherein the groove and optical waveguides are formed so that an optical reflection angle of the light incident from the first optical waveguide caused by the optical element and an angle formed by the second optical waveguide with the first optical waveguide coincide.

4. An optical branched waveguide as set forth in claim 3, wherein the optical element is obtained by forming a thin optical film on an organic film transparent with respect to the guided light.

5. An optical branched waveguide as set forth in claim 4, where the thin optical film is constituted by a multiple-layer interference film or metal film.

6. An optical branched waveguide as set forth in claim 2, wherein the optical element comprises a thin optical film formed on a thin sheet comprised of an inorganic material transparent to the guided light.

7. An optical branched waveguide as set forth in claim 6, wherein the thin optical film is constituted by a multiple-layer interference film or metal film.

8. An optical branched waveguide as set forth in claim 2, wherein the substrate is constituted by a member having an electro-optic effect.

9. An optical branched waveguide as set forth in claim 2, wherein the substrate is constituted by a member having a piezoelectric effect.

10. An optical branched waveguide as set forth in claim 6, wherein a light branching ratio for transmitting and reflecting the light of the optical element is 1:1.

11. An optical waveguide comprising at least one set of an optical branched waveguide, including a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is inserted into at least the intersecting region of the first optical waveguide and the second optical waveguide in the groove, allows part of the incident light guided through the first optical waveguide to pass therethrough and guides it to the first optical waveguide and, at the same time, reflects part of the incident light and guides it to the second optical waveguide and having connected to at least one optical waveguide of an input portion or an output portion thereof the optical waveguide of another optical branched waveguide.

12. An optical waveguide circuit as set forth in claim 11, comprising electrodes for applying an electric field for creating the electro-optic effect in parts of the optical waveguides.

13. An optical waveguide circuit comprising at least one set of an optical branched waveguide, including a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is inserted into at least the intersecting region of the first optical waveguide and the second optical waveguide in the groove, allows part of the incident light guided through the first optical waveguide to pass therethrough and guides it to the first optical waveguide and, at the same time, reflects part of the incident light and guides it to the second optical waveguide and having electrodes for applying an electric field for creating the piezoelectric effect in parts of the optical waveguide.

14. An optical branched waveguide comprising:

a substrate;

a first optical waveguide formed on the substrate;

a second optical waveguide formed on the substrate so as to intersect with the first optical waveguide at a predetermined angle;

a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide, and reflects part of the incident light and guides this to the second optical waveguide.

15. An optical branched waveguide as set forth in claim 14, wherein the groove and optical waveguides are formed so that an optical reflection angle of the light incident from the first optical waveguide caused by the optical element and an angle formed by the second optical waveguide with the first optical waveguide coincide.

16. An optical branched waveguide as set forth in claim 14, wherein the optical element is obtained by forming a thin optical film on an organic film transparent with respect to the guided light.

17. An optical branched waveguide as set forth in claim 16, where the thin optical film is formed by a multiple-layer interference film or metal film.

18. An optical branched waveguide as set forth in claim 14, wherein the optical element comprises a thin optical film formed on a thin sheet comprised of an inorganic material transparent to the guided light.

19. An optical branched waveguide as set forth in claim 18, wherein the thin optical film is formed by a multiple-layer interference film or metal film.

20. An optical branched waveguide as set forth in claim 14, wherein the substrate is formed by a member having an electro-optic effect.

21. An optical branched waveguide as set forth in claim 14, wherein the substrate is formed by a member having a piezoelectric effect.

22. An optical branched waveguide as set forth in claim 14, wherein the light branching ratio for transmitting and reflecting the light of the optical element is 1:1.

23. An optical waveguide circuit comprising at least one set of an optical branched waveguide, including a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide and, at the same time, reflects part of the incident light and guides this to the second optical waveguide and having connected to at least one optical waveguide of an input portion or an output portion thereof the optical waveguide of another optical branched waveguide.

24. An optical waveguide circuit as set forth in claim 23, comprising at least one set of the optical branched waveguides and having electrodes for applying an elecric field for creating an electro-optic effect at parts of the optical waveguides.

25. An optical waveguide circuit comprising at least one set of an optical branched waveguide, including a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide, and reflects part of the incident light and guides this to the second optical waveguide and having electrodes for applying an elecric field for creating an electro-optic effect at parts of the optical waveguides.

26. A process of producing an optical branched waveguide comprising a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide and, at the same time, reflects part of the incident light and guides this to the second optical waveguide, in said process of producing an optical branched waveguide, the optical element being formed after formation of the groove at one side of the groove by inclining the substrate and performing vapor deposition or sputtering.

27. A process of producing an optical branched waveguide comprising a substrate; a first optical waveguide formed on the substrate; a second optical waveguide formed on the substrate so as to intersect with the first optical waveguide at a predetermined angle; a groove formed in at least the intersecting region of the first optical waveguide and the second optical waveguide of the substrate; and an optical element which is provided at one side at least at the intersecting region of the first optical waveguide and the second optical waveguide in the groove, allows part of the incident light guided through the first optical waveguide to pass therethrough and guides this to the first optical waveguide and, at the same time, reflects part of the incident light and guides this to the second optical waveguide, said process of producing an optical branched waveguide including:

a step of forming a peelable film on the surface of the substrate in advance, a step of forming the groove, a step forming the optical element at one side of the groove by inclining the substrate and performing vapor deposition or sputtering, and a step of peeling off the peelable film on the surface of the substrate and removing the film formed by vapor deposition or sputtering on the surface of the substrate.

28. An optical branched waveguide comprising:

a substrate;

a first optical waveguide formed on the substrate;

a second optical waveguide formed on the substrate so as to intersect with the first optical waveguide at a predetermined angle; and an optical element which is provided in an intersecting region of the first optical waveguide and the second optical waveguide, allows part of an incident light guided through the first optical waveguide to pass therethrough and guides it to the first optical waveguide and, at the same time, reflects part of the incident light and guides it to the second optical waveguide, the width of the waveguide facing the optical element of at least one optical waveguide being set larger than the width of the waveguide of the other parts.

29. An optical branched waveguide comprising:

a substrate;

a first optical waveguide formed on the substrate;

a second optical waveguide formed on the substrate so as to intersect with the first optical waveguide at a predetermined angle;

a groove formed in at least the intersecting region of the first optical waveguide and the second optical waveguide of the substrate; and an optical element which is inserted into at least at the intersecting region of the first optical waveguide and the second optical waveguide in the groove, allows part of the incident light guided through the first optical waveguide to pass therethrough and guides it to the first optical waveguide and, at the same time, reflects part of the incident light and guides it to the second optical waveguide, the width of the waveguide facing the groove being set larger than the width of the waveguide of the other parts.

30. An optical branched waveguide as set forth in claim 29, wherein the groove and optical waveguides are formed so that an optical reflection angle of the light incident from the first optical waveguide caused by the optical element and an angle formed by the second optical waveguide with the first optical waveguide coincide.

31. An optical branched waveguide as set forth in claim 29, wherein the wide width optical waveguide and other waveguide portion are connected by a step.

32. An optical branched waveguide as set forth in claim 29, wherein the wide width optical waveguide and other waveguide portion are connected by a taper.

33. An optical branched waveguide comprising:

a substrate;

a first optical waveguide formed on the substrate;

a second optical waveguide formed on the substrate so as to intersect with the first optical waveguide at a predetermined angle;

a groove formed in at least the intersecting region of the first optical waveguide and the second optical waveguide of the substrate; and an optical element which is inserted into at least at the intersecting region of the first optical waveguide and the second optical waveguide in the groove, allows part of the incident light guided through the first optical waveguide to pass therethrough and guides it to the first optical waveguide, and reflects part of the incident light and guides it to the second optical waveguide, the center axes of the optical waveguides sandwiching the groove being deviated by exactly a dimension corresponding to the deviation of the optical axes due to an average refractive index of the groove portion.

34. An optical branched waveguide as set forth in claim 33, where the groove and optical waveguides are formed so that an optical reflection angle of the light incident from the first optical waveguide caused by the optical element and an angle formed by the second optical waveguide with the first optical waveguide coincide.

35. An optical modulator comprising:

a substrate;

a first optical waveguide which is formed on the substrate, comprises an electro-optic material, has one end portion serving as a light incident portion;

a second optical waveguide which is formed on the substrate so as to intersect with the first optical waveguide at a predetermined angle, comprises an electro-optic material, and has one end portion serving as a light emitting portion;

a first full reflection optical member provided at the other end portion of the first optical waveguide;

a second full reflection optical member provided at the other end portion of the second optical waveguide;

a partial reflection optical member which is provided at the intersecting portion of the first optical waveguide and the second optical waveguide, reflects part of the light striking the first optical waveguide and makes it incident in the direction of the end portion of the side where the second full reflection optical member of the second optical waveguide is provided, allows part to pass therethrough and makes it incident in the direction of the first full reflection optical member of the first waveguide, reflects parts of the lights reflected at the first and second full reflection optical members and made incident upon it and guides the same to the other waveguide different from the optical waveguide to which the light was guided, and allows parts to pass therethrough and subsequently guides the same through the optical waveguide through which the light was guided; and an electrode provided at least at one of a space between the partial reflection optical member and the first full reflection optical member of the first optical waveguide and a space between the partial reflection optical member and the second full reflection optical member of the second optical waveguide and applying an electric field based on a desired modulation signal to the optical waveguide.

36. An optical modulator as set forth in claim 35, wherein:

the substrate is formed with a groove having side walls covering the cross-section of the optical waveguides at the intersecting portion of the first optical waveguide and the second optical waveguide and the partial reflection optical member is formed by inserting a film member forming the partial transmission and partial reflection film for obtaining a desired light branching ratio into the groove.

37. An optical modulator as set forth in claim 35, wherein:

the substrate is formed with a groove having side walls covering the cross-section of the optical waveguides at the intersecting portion of the first optical waveguide and the second optical waveguide and the partial reflection optical member is configured by directly forming the partial transmission and partial reflection film for obtaining a desired light branching ratio on a side wall of the groove.

38. An optical modulator as set forth in claim 35, wherein the first optical waveguide and the second optical waveguide intersect each other at a large intersecting angle of 45 to 90°.

39. An optical modulator as set forth in claim 38, wherein the first and second optical waveguides intersect at right angles to each other and the partial reflection optical member intersects the first and second waveguides at 45° each.

* * * * *